US007922183B2

(12) United States Patent
Figel et al.

(10) Patent No.: US 7,922,183 B2

(45) Date of Patent: Apr. 12, 2011

(54) STRETCHER HAVING HAND ACTUATED WHEEL BRAKING APPARATUS

(75) Inventors: Gregory J. Figel, Alpine, TX (US); Kenneth Q. Rudolf, Batesville, IN (US); David A. Albersmeyer, Hoagland, IN (US); Richard Henry Heimbrock, Cincinnati, OH (US); Jonathan D. Turner, Dillsboro, IN (US); Brian T. Wiggins, Burlington, IN (US); Eugene E. Osborne, Hebron, KY (US); Nicholas C. Batta, Batesville, IN (US)

(73) Assignee: Hill-Rom Services, Inc., Wilmington, DE (US)

( * ) Notice: Subject to any disclaimer, the term of this patent is extended or adjusted under 35 U.S.C. 154(b) by 591 days.

(21) Appl. No.: 11/692,215

(22) Filed: Mar. 28, 2007

(65) Prior Publication Data

US 2007/0216117 A1 Sep. 20, 2007

Related U.S. Application Data

(63) Continuation-in-part of application No. 11/622,062, filed on Jan. 11, 2007, now Pat. No. 7,810,822.

(60) Provisional application No. 60/760,343, filed on Jan. 19, 2006, provisional application No. 60/804,227, filed on Jun. 8, 2006, provisional application No. 60/846,002, filed on Sep. 20, 2006.

(51) Int. Cl.

| | |
|---|---|
| ***B62B 7/04*** | (2006.01) |
| ***A61G 1/02*** | (2006.01) |
| ***A61G 1/04*** | (2006.01) |
| ***A61G 1/048*** | (2006.01) |
| *A61G 7/012* | (2006.01) |

(52) U.S. Cl. .................. 280/47.38; 280/47.41; 280/640; 280/79.11; 280/79.2

(58) Field of Classification Search ............... 280/47.38, 280/47.371, 47.4, 47.41, 638, 35, 639, 640, 280/79.11, 79.2

See application file for complete search history.

(56) References Cited

U.S. PATENT DOCUMENTS

| | | | |
|---|---|---|---|
| 1,118,931 | A | 12/1914 | Hasley |
| 2,096,229 | A | 10/1937 | Dudley |
| 2,572,548 | A | 10/1951 | Weisz et al. |
| 2,687,546 | A | 8/1954 | Oppenheimer |
| 3,304,116 | A | 2/1967 | Stryker |

(Continued)

FOREIGN PATENT DOCUMENTS

CA 731839 4/1966

(Continued)

OTHER PUBLICATIONS

European search report from EP 08 25 1082 dated Aug. 6, 2008.

*Primary Examiner* — J. Allen Shriver, II
*Assistant Examiner* — Bryan A Evans
(74) *Attorney, Agent, or Firm* — Barnes & Thornburg LLP

(57) ABSTRACT

A patient support apparatus includes a frame, a plurality of casters coupled to the frame and supporting the frame above a floor, a wheel, a push handle that is coupled to the frame and that is gripable to maneuver the patient support apparatus along the floor, and a brake handle coupled to the push handle and movable to move a brake to impede rotation of the wheel.

19 Claims, 23 Drawing Sheets

U.S. PATENT DOCUMENTS

| | | | | |
|---|---|---|---|---|
| 3,409,105 | A | 11/1968 | Clinton | |
| 3,479,681 | A | 11/1969 | Maslow | |
| 3,493,085 | A | 2/1970 | Libhart | |
| 3,635,491 | A | 1/1972 | Drews et al. | |
| 3,705,438 | A | 12/1972 | Stosberg et al. | |
| 3,739,406 | A | 6/1973 | Koetter | |
| 3,872,945 | A | 3/1975 | Hickman et al. | |
| 3,988,800 | A | 11/1976 | Sachser | |
| 4,014,408 | A * | 3/1977 | Armstrong | 188/24.15 |
| 4,076,266 | A | 2/1978 | Krausz | |
| 4,077,087 | A | 3/1978 | Mooney | |
| 4,164,355 | A | 8/1979 | Eaton et al. | |
| 4,175,783 | A | 11/1979 | Pioth | |
| 4,248,445 | A | 2/1981 | Vassar | |
| 4,276,962 | A | 7/1981 | Aulik | |
| 4,309,791 | A | 1/1982 | Aulik | |
| 4,325,467 | A * | 4/1982 | Kine | 188/24.12 |
| 4,385,414 | A | 5/1983 | Damico | |
| 4,414,702 | A | 11/1983 | Neumann | |
| 4,439,879 | A | 4/1984 | Werner | |
| 4,526,253 | A | 7/1985 | Schmidt | |
| 4,629,242 | A | 12/1986 | Schrager | |
| 4,677,706 | A | 7/1987 | Screen | |
| 4,722,114 | A | 2/1988 | Neumann | |
| 4,723,808 | A | 2/1988 | Hines | |
| 4,763,910 | A | 8/1988 | Brundli et al. | |
| 4,788,741 | A | 12/1988 | Hilborn | |
| 4,815,161 | A | 3/1989 | Timmer et al. | |
| 4,875,696 | A | 10/1989 | Welch et al. | |
| 4,922,574 | A | 5/1990 | Heiligenthal et al. | |
| 5,014,391 | A | 5/1991 | Schulte | |
| 5,029,891 | A * | 7/1991 | Jacobs | 280/650 |
| 5,046,748 | A | 9/1991 | Oat-Judge | |
| 5,083,341 | A | 1/1992 | Milbredt et al. | |
| 5,133,106 | A | 7/1992 | Milbredt et al. | |
| 5,139,116 | A | 8/1992 | Screen | |
| 5,184,373 | A | 2/1993 | Lange | |
| 5,242,035 | A | 9/1993 | Lange | |
| 5,244,062 | A | 9/1993 | Felton | |
| 5,261,682 | A | 11/1993 | Chuang | |
| 5,279,010 | A | 1/1994 | Ferrand et al. | |
| D343,788 | S | 2/1994 | Soltani | |
| 5,303,450 | A | 4/1994 | Lange | |
| 5,343,988 | A | 9/1994 | Bartsch et al. | |
| 5,348,326 | A | 9/1994 | Fullenkamp et al. | |
| 5,377,372 | A | 1/1995 | Rudolf et al. | |
| 5,450,639 | A | 9/1995 | Weismiller et al. | |
| 5,456,336 | A | 10/1995 | Bopp | |
| 5,479,840 | A | 1/1996 | Hilliard et al. | |
| 5,497,856 | A | 3/1996 | Block et al. | |
| 5,503,416 | A | 4/1996 | Aoki et al. | |
| 5,634,532 | A | 6/1997 | Bucher | |
| 5,774,936 | A | 7/1998 | Vetter | |
| 5,806,111 | A * | 9/1998 | Heimbrock et al. | 5/86.1 |
| 5,987,671 | A | 11/1999 | Heimbrock et al. | |
| 5,996,149 | A | 12/1999 | Heimbrock et al. | |
| 6,000,076 | A | 12/1999 | Webster et al. | |
| 6,016,580 | A | 1/2000 | Heimbrock et al. | |
| 6,076,208 | A | 6/2000 | Heimbrock et al. | |
| 6,158,757 | A | 12/2000 | Tidcomb | |
| 6,230,343 | B1 | 5/2001 | Buiskool et al. | |
| 6,240,579 | B1 | 6/2001 | Hanson et al. | |
| 6,240,713 | B1 | 6/2001 | Thomas | |
| 6,256,812 | B1 | 7/2001 | Bartow et al. | |
| 6,264,006 | B1 | 7/2001 | Hanson et al. | |
| 6,282,738 | B1 | 9/2001 | Heimbrock et al. | |
| 6,286,165 | B1 | 9/2001 | Heimbrock et al. | |
| 6,286,183 | B1 | 9/2001 | Stickel et al. | |
| 6,296,261 | B1 * | 10/2001 | deGoma | 280/47.34 |
| 6,314,597 | B2 | 11/2001 | Heimbrock et al. | |
| 6,315,319 | B1 | 11/2001 | Hanson et al. | |
| 6,321,878 | B1 | 11/2001 | Mobley et al. | |
| 6,330,926 | B1 | 12/2001 | Heimbrock et al. | |
| 6,353,948 | B1 | 3/2002 | Bolden et al. | |
| 6,401,278 | B1 | 6/2002 | Hayes et al. | |
| 6,421,854 | B1 | 7/2002 | Heimbrock | |
| 6,446,283 | B1 | 9/2002 | Heimbrock et al. | |
| 6,453,508 | B1 | 9/2002 | Denner | |
| 6,460,205 | B1 | 10/2002 | Lewandowski et al. | |
| 6,473,921 | B2 | 11/2002 | Brooke et al. | |
| 6,505,359 | B2 | 1/2003 | Heimbrock et al. | |
| 6,588,523 | B2 | 7/2003 | Heimbrock et al. | |
| 6,615,430 | B2 | 9/2003 | Heimbrock | |
| 6,691,346 | B2 | 2/2004 | Osborne et al. | |
| 6,701,554 | B2 | 3/2004 | Heimbrock | |
| 6,726,279 | B1 | 4/2004 | Figel et al. | |
| 6,752,224 | B2 | 6/2004 | Hopper et al. | |
| 6,772,460 | B2 | 8/2004 | Heimbrock et al. | |
| 6,792,630 | B1 | 9/2004 | Palmatier et al. | |
| 6,820,294 | B2 | 11/2004 | Shiery et al. | |
| 6,865,775 | B2 | 3/2005 | Ganance | |
| 6,902,019 | B2 | 6/2005 | Heimbrock et al. | |
| 6,951,034 | B2 | 10/2005 | Shiery et al. | |
| 6,978,500 | B2 | 12/2005 | Osborne et al. | |
| 7,062,805 | B2 | 6/2006 | Hopper et al. | |
| 2002/0033307 | A1 | 3/2002 | Mobley et al. | |
| 2003/0131413 | A1 | 7/2003 | Dietrich | |
| 2003/0159861 | A1 | 8/2003 | Hopper et al. | |
| 2004/0139545 | A1 | 7/2004 | Reinke et al. | |
| 2005/0023787 | A1 * | 2/2005 | Haynes | 280/79.11 |
| 2005/0057010 | A1 | 3/2005 | Hopper et al. | |

FOREIGN PATENT DOCUMENTS

| | | | |
|---|---|---|---|
| CH | 250239 | | 8/1947 |
| CH | 570802 | | 12/1975 |
| DE | 195 16 586 | A | 11/1996 |
| EP | 1 243 241 | A1 | 9/2002 |
| EP | 1 810 652 | A2 | 1/2007 |
| FR | 2 836 375 | A | 8/2003 |
| GB | 415450 | | 8/1934 |
| GB | 2261173 | A | 5/1993 |
| GB | 2 343 841 | A | 5/2000 |
| GB | 2 349 126 | A | 10/2000 |
| JP | 10211146 | A | 8/1998 |
| JP | 11235362 | A | 8/1999 |
| WO | 00/51830 | A1 | 9/2000 |
| WO | 03/057126 | A1 | 7/2003 |
| WO | 03/072373 | A1 | 10/2007 |

* cited by examiner

STRETCHER HAVING HAND ACTUATED WHEEL BRAKING APPARATUS

CROSS REFERENCE TO RELATED APPLICATIONS

This application is a continuation-in-part of U.S. patent application Ser. No. 11/622,062, filed Jan. 11, 2007, which claims the benefit of a U.S. Provisional Patent Application No. 60/760,343, filed Jan. 19, 2006, and entitled "Procedural Stretcher," a U.S. Provisional Patent Application No. 60/804,227, filed Jun. 8, 2006, and entitled "Stretcher," and a U.S. Provisional Patent Application No. 60/846,002, filed Sep. 20, 2006, and entitled "Active Brake Caster." The disclosures of the three U.S. Provisional Patent Application Nos. 60/760,343, 60/804,227, and 60/846,002 and the U.S. patent application Ser. No. 11/622,062, are hereby incorporated by reference herein.

BACKGROUND OF THE INVENTION

The present disclosure generally relates to a patient support apparatus, such as a stretcher, having wheels or casters for rolling the patient support apparatus from location to location. More particularly, the present disclosure relates to a caster braking apparatus for such a patient support apparatus. The present invention also relates to foot pedals for operating other mechanisms, such as an elevation adjustment mechanism.

Stretchers are typically designed to be moved from location to location in a hospital or other healthcare facility. Therefore, stretchers have wheels or casters which permit the stretcher to be rolled and steered between locations. During movement, it is desirable to have free rolling wheels, but upon reaching the desired location, brakes are usually applied to the casters to maintain the stretcher at the desired location. It is well known to provide stretchers with casters which include mechanisms for blocking the rotation of the casters and for blocking swiveling movement of the caster yoke. Foot pedals are typically provided for controlling the caster braking mechanisms of the casters.

When the casters of conventional stretchers are braked, the associated braking mechanisms usually engage the caster wheels with sufficient force to prevent any rolling of the caster wheels, thereby rendering the stretcher stationary for all practical purposes. As such, if a stretcher with this sort of conventional caster braking mechanism is being transported and the transporter desires to slow the stretcher down during transport, such as when transporting the stretcher down a ramp of the type oftentimes found in healthcare facilities, it is not feasible to use the conventional caster braking mechanism because complete stoppage of the rolling of the caster wheels is not desired.

Although the term "stretcher" is used throughout this disclosure, it is understood that the teachings of this disclosure may be incorporated into other types of patient support apparatuses, such as, for example, hospital beds, imaging tables, operating tables, and so on. The term "patient support apparatus," as used in this description and claims, therefore, shall be understood to include any type of patient support apparatus, such as, for example, a stretcher, a hospital bed, an imaging table, an operating table, and the like.

SUMMARY OF THE INVENTION

The present invention comprises an apparatus that has one or more of the features listed in the appended claims, or one or more of following features or combinations thereof, which alone or in any combination may comprise patentable subject matter:

A patient support apparatus may comprise a frame, a plurality of casters coupled to the frame and supporting the frame above a floor, a wheel, a push handle coupled to the frame and gripable to maneuver the patient support apparatus along the floor, and a brake handle coupled to the push handle and movable to brake the wheel. The wheel may be movable relative to the frame between a first position engaging the floor and a second position spaced apart from the floor. The push handle may be movable between a use position and a storage position.

The apparatus may further comprise a brake coupled to the brake handle and movable between a braking position engaging the wheel to impede the rotation of the wheel and a releasing position allowing rotation of the wheel. The brake may normally allow rotation of the wheel, and the brake may impede the rotation of the wheel when the brake handle is activated. The brake may include a caliper arm carrying a brake pad. The brake handle may be coupled to the caliper arm for moving the brake pad into and out of engagement with the wheel. The brake may include a cable having a first end coupled to the brake handle and a second end coupled to the caliper arm.

The caliper arm may comprise a pair of caliper arms. Each caliper arm may carry a brake pad. Each caliper arm may have an extension on one side thereof. The caliper arms may be pivoted about a common pivot axis such that the brake pads may be disposed on opposite sides of the wheel. A sheath of the Bowden cable may be coupled to one of the two extensions and a wire of the Bowden cable may be coupled to the other of the two extensions so that when the brake handle is activated the caliper arms move the brake pads against the wheel. The brake pads may engage a rim of the wheel. The brake pads may engage a hub of the wheel. The brake pads may engage a tread of the wheel. The common pivot axis of the caliper arms may extend in a direction generally perpendicular to an axis of rotation of the wheel.

The frame may comprise a lower frame and an upper frame supported above the lower frame and movable relative to the lower frame. The plurality of casters may be coupled to the lower frame. The push handle may be coupled to the upper frame. The Bowden cable may be routed from the brake handle through the push handle. The push handle may include a hollow tube portion, and the Bowden cable may be routed through the hollow tube portion. The push handle may include a bend at a region defining an intersection of a generally vertically-extending portion and a generally horizontally-extending portion, and the Bowden cable may be routed through the bend. The generally horizontally-extending portion may extend generally perpendicular to a longitudinal axis of the frame. The push handle may include a bottom portion, and the Bowden cable may exit the push handle through the bottom portion.

Additional features, which alone or in combination with any other feature(s), such as those listed above and those listed in the appended claims, may comprise patentable subject matter and will become apparent to those skilled in the art upon consideration of the following detailed description of illustrative embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION OF THE DRAWINGS

Figure 1:
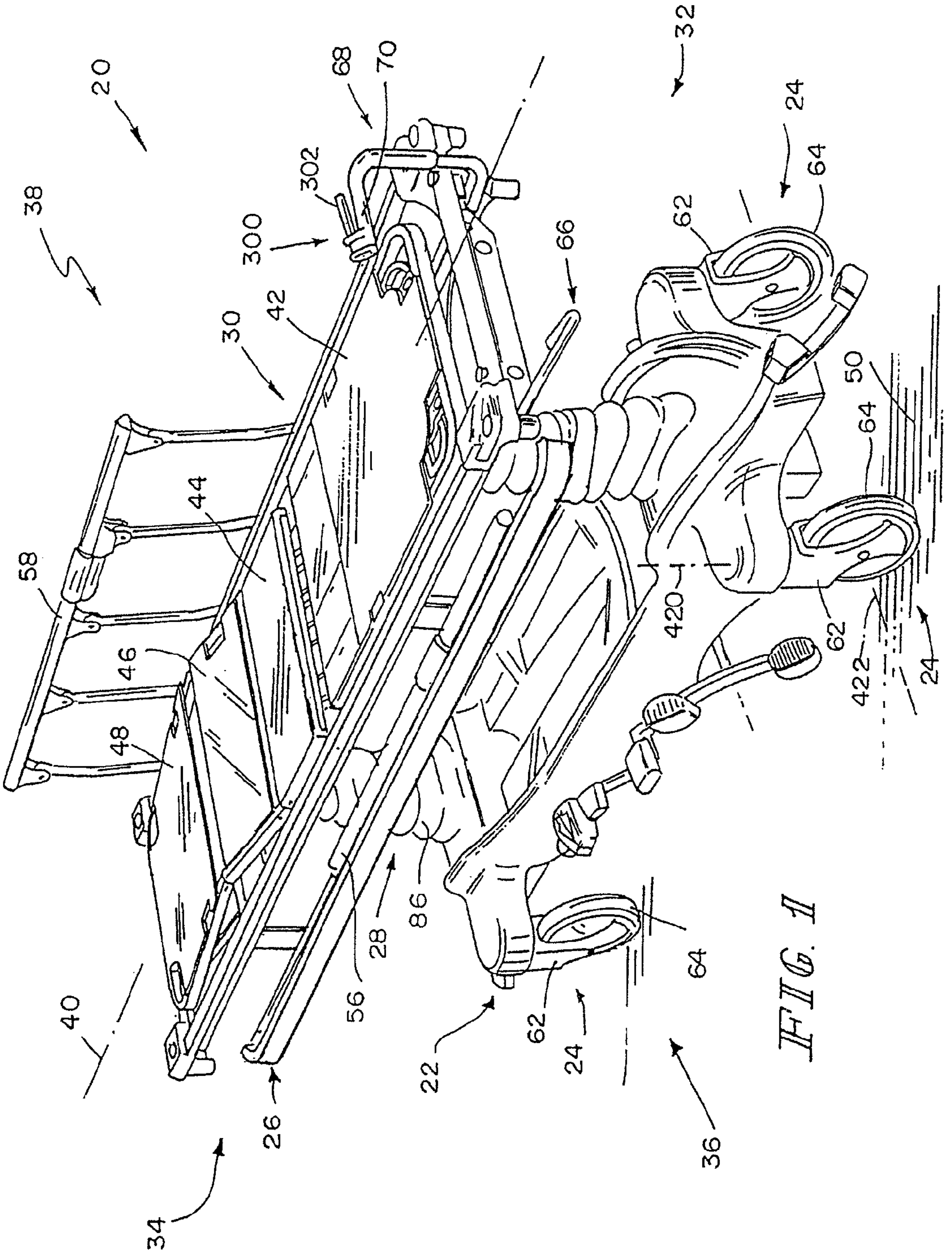
FIG. 1 is a perspective view of an illustrative stretcher showing a lower frame supported on casters, an upper frame supported above the lower frame, a deck carried by the upper frame, the deck having head, seat, thigh, and foot sections, a pair of push handles coupled to the upper frame near a head end of the stretcher, a pair of siderails on opposite sides of the upper frame, and a plurality of foot pedals coupled to the lower frame.
Figure 8:
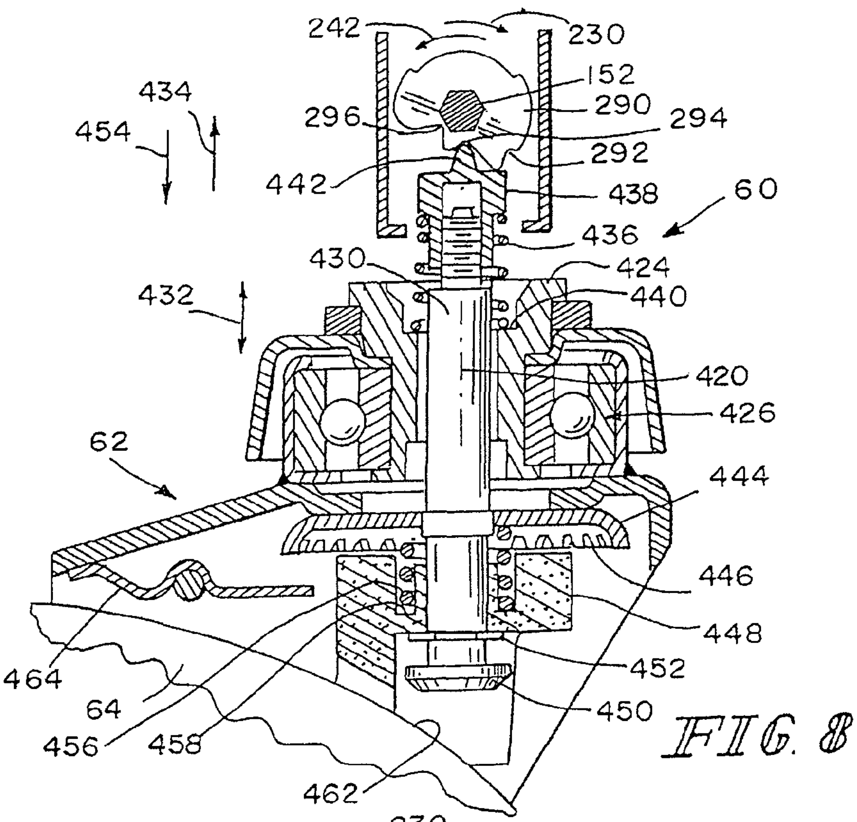
FIG. 8 is a cross-sectional view of portions of an active brake caster in a neutral mode showing a cam mounted on the lateral brake rod, a plunger having a tip received in a notch in the cam, a contoured brake shoe coupled to a lower end of the plunger for vertical and rotational movement, and a standard brake shoe fixedly coupled to the plunger below the contoured brake shoe, both brake shoes being shown spaced from the caster wheel.

Referring to FIG. 1, a patient support apparatus, such as a stretcher 20, includes a lower frame 22 supported on casters 24, an upper frame 22 coupled to the lower frame 22 by an elevation adjustment mechanism 28, a patient support deck 30 coupled to the upper frame 22, a head end 32, a foot end 34, an elongated left side 36, an elongated right side 38, and a longitudinal axis 40. The deck 30 includes longitudinally-spaced head, seat, thigh and foot sections 42, 44, 46, 48. The deck sections 42, 44, 46, 48 define an upwardly-facing support surface that supports a mattress pad (not shown), which, in turn, supports a patient. As shown in FIG. 8, each caster 24 includes a stem 60, a yoke or fork 62 coupled to the stem 60 for pivoting movement about a vertical axis 420 and a caster wheel 64 coupled to the yoke 62 for rotation about a horizontal axis 422. The casters 24 allow the stretcher 20 to be rolled over a floor 50 to transport a patient. A pair of collapsible side rails 56, 58 are mounted to upper frame 22 adjacent to the left and right sides 36, 38 of the deck 30. Each of the siderails 56, 58 is independently movable between a lowered position (shown with respect to the left siderail 56 in FIG. 1) and a raised position (shown with respect to the right siderail 58 in FIG. 1).

As used in this description, the phrase “head end 32” will be used to denote the end of any referred-to object that is positioned to lie nearest the head end 32, and the phrase “foot end 34” will be used to denote the end of any referred-to object that is positioned to lie nearest the foot end 34. Likewise, the phrase “left side 36” will be used to denote the side of any referred-to object that is positioned to lie nearest the left side 36, and the phrase “right side 38” will be used to denote the side of any referred-to object that is positioned to lie nearest the right side 38.

Figure 7:
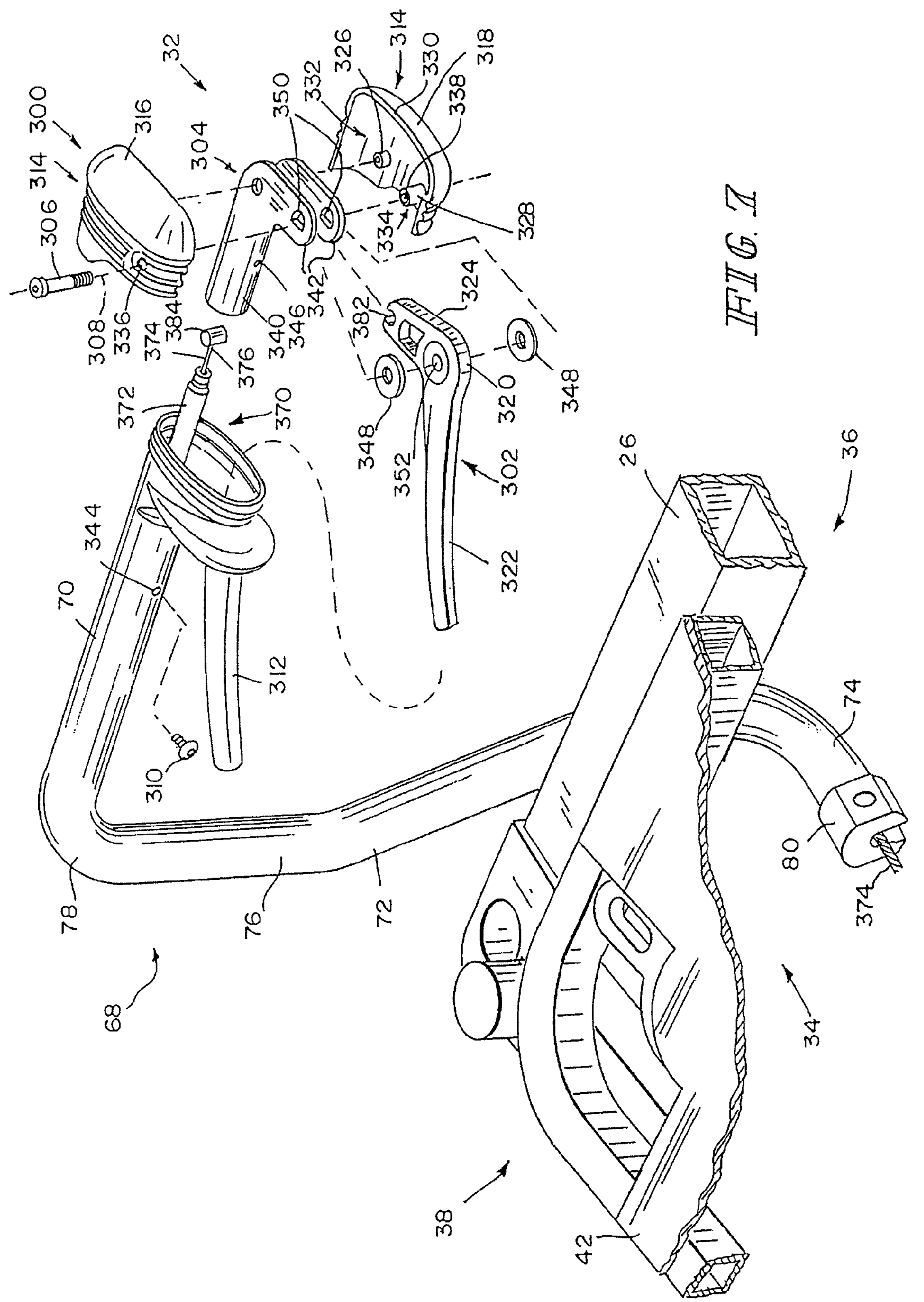
FIG. 7 is an exploded perspective view of portions of the hand-actuated caster braking apparatus showing the brake handle, the push handle and the flexible covering encasing the brake handle and portions of the push handle.

A pair of push handles 66, 68 are mounted to the upper frame 22 near the head end 32 adjacent to left and right sides 36, 38 of the deck 30. Each of the push handles 66, 68 is independently movable between a lowered storage position (shown with respect to the left handle 66 in FIG. 1) and a raised push position (shown with respect to the right handle 68 in FIG. 1). When the push handles 66, 68 are locked in the push positions, a caregiver can grip the push handles 66, 68 to maneuver the stretcher 20 over the floor 50. When the push handles 66, 68 are in the storage positions, the push handles 66, 68 are below and out of the way, thus maximizing a caregiver’s access to a patient on the deck 30. As shown in FIG. 7, the push handles 66, 68 each include a handle post 70 that is grasped by the caregiver when the caregiver moves the stretcher 20, a pivot post 74 pivotably coupled to upper frame 22, and a bent extension post 72 connecting the handle post 70 to the pivot post 74. The respective handle post 70, extension post 72, and pivot post 74 of each push handle 66, 68 are integrally connected in a serpentine-like configuration as shown in FIG. 7. The handle posts 70 of the push handles 66, 68 extend generally perpendicularly to the longitudinal axis 40 of the stretcher 20 when the push handles 66, 68 are in the push positions (as shown with respect to the right push handle 68 in FIG. 1). In the illustrated embodiment, the push handles 66, 68 are in the form of extruded hollow tubes having a circular cross section, and made from rigid high strength, light weight materials, such as steel or aluminum. U.S. Pat. No. 5,806,111 discloses illustrative push handles that are independently movable relative to an upper frame of the stretcher between a lowered storage position and a raised push position. U.S. Pat. No. 5,806,111 is hereby incorporated by reference herein.

Figure 2:
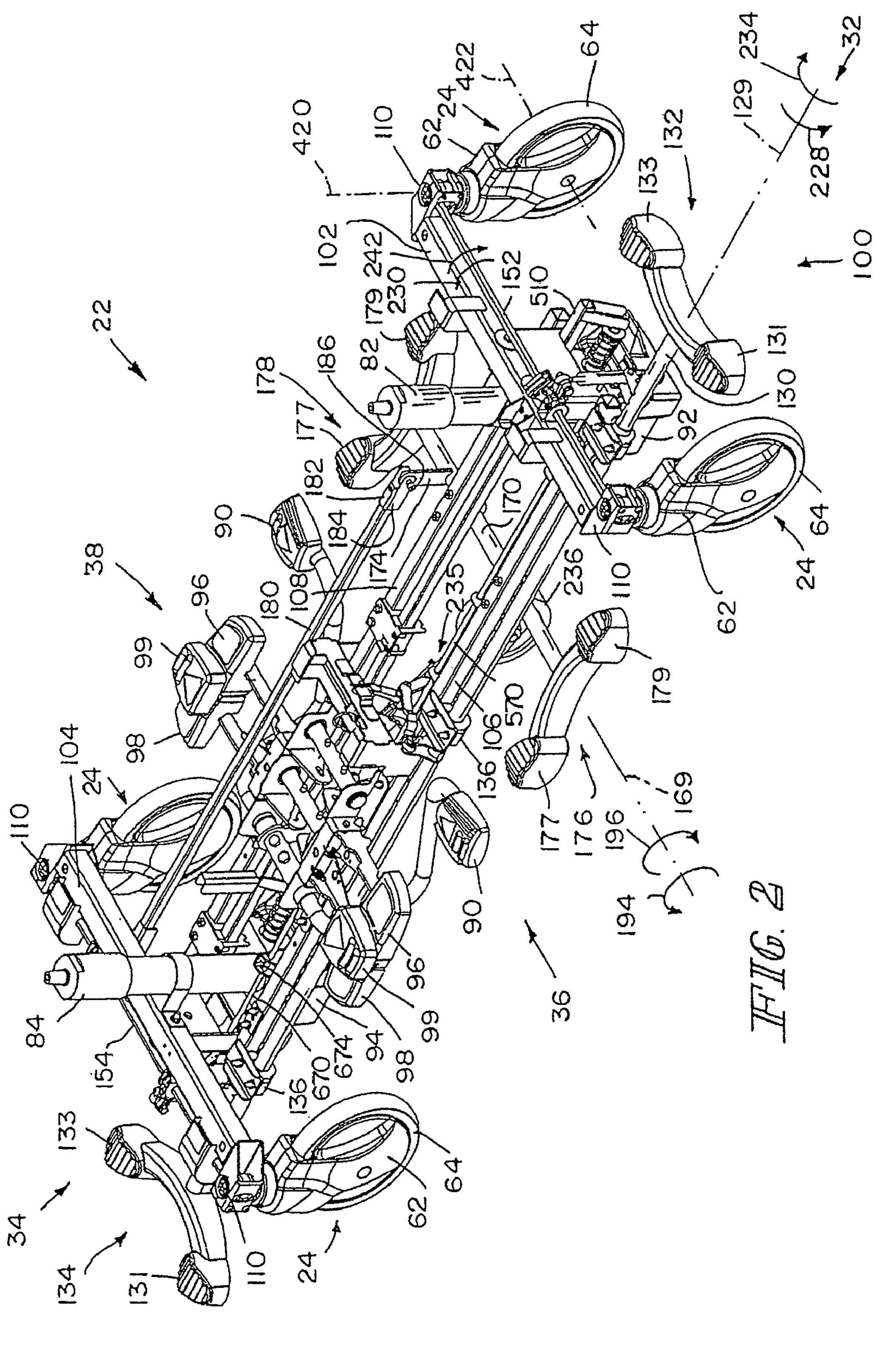
FIGS. 2 and 3 are perspective views of the lower frame with a shroud removed to expose the lower frame, showing the lower frame having two cross frame members extending between two longitudinal side frame members, a caster coupled to each end of each of the two cross frame members, head end and foot end hydraulic pumps and cylinders supported by the lower frame, a steering wheel supported relative to the lower frame in a central region thereof, a longitudinal brake-steer shaft, two butterfly pedals coupled to the opposite ends of the longitudinal brake-steer shaft, a lateral brake-steer shaft, two butterfly pedals coupled to the opposite ends of the lateral brake-steer shaft, and a longitudinally-shifting frame member having a head end coupled to the lateral brake-steer shaft and a foot end coupled to a lateral brake rod near the foot end.
Figure 3:
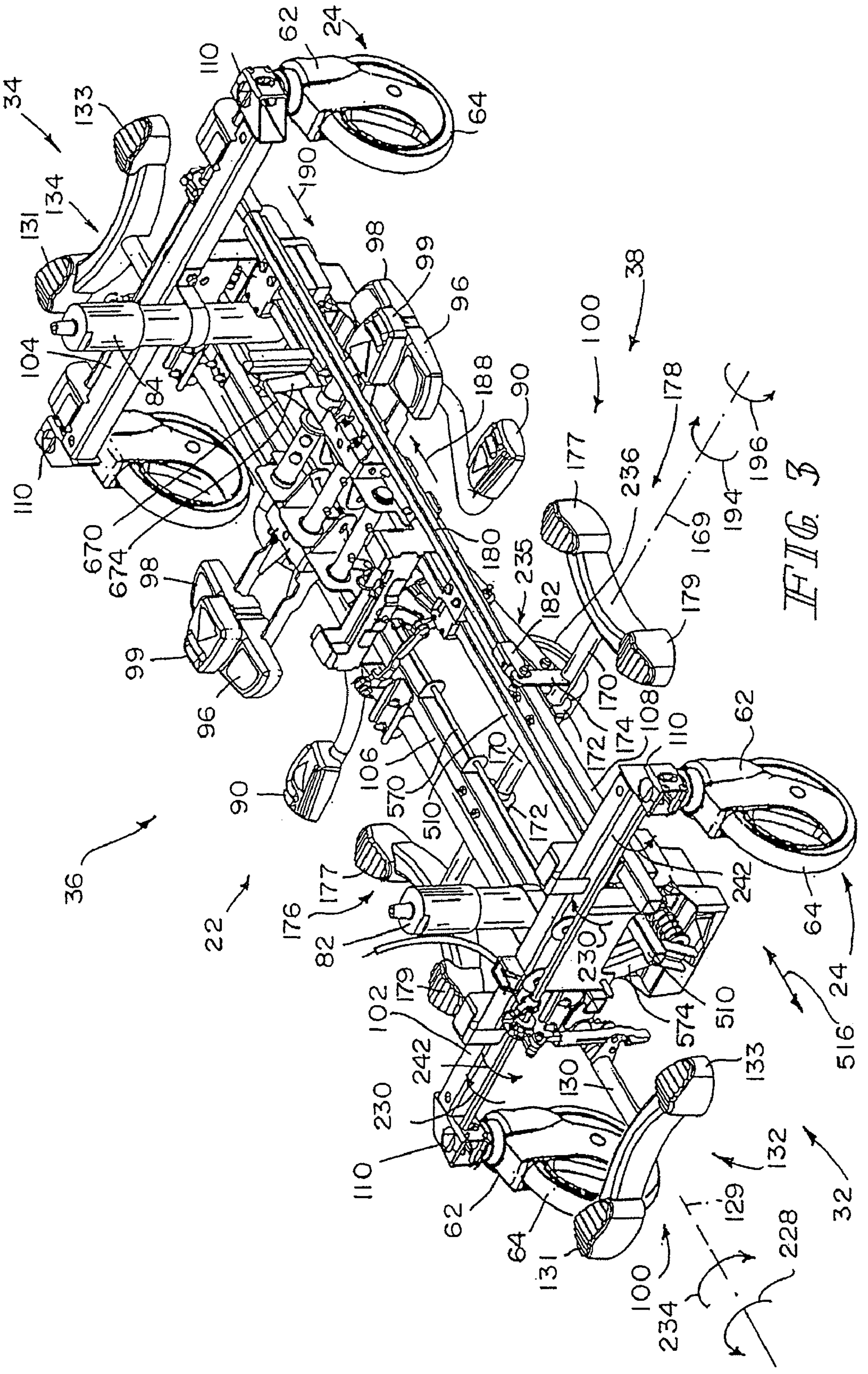

The elevation adjustment mechanism 28 is operable to raise, lower, and tilt the upper frame 22 relative to the lower frame 22. As shown in FIGS. 2-3, in the illustrated embodiment, the elevation adjustment mechanism 28 includes head and foot end hydraulic cylinders 82 and 84 covered by flexible boots 86 (FIG. 1). The cylinders 82, 84 are coupled to respective hydraulic pumps 92, 94 supported on the lower frame 22. Coupled to each side of the lower frame 22 are a pump pedal 90, a pair of side pedals 96, 98 and a center pedal 99 supported by the side pedals 96, 98. In addition, in some embodiments, pump pedals, similar to the pump pedals 90, 96, 98, 99, are coupled to the foot end 34 of the lower frame 22. The pump pedal 90 is operable to simultaneously raise both the head and foot ends 32, 34 of the upper frame 22 relative to the lower frame 22. The side pedal 96 is operable to lower the head end 32 of the upper frame 22 relative to the foot end 34 of the upper frame 22 (i.e., a Trendelunburg position). The side pedal 98 is operable to lower the foot end 34 of the upper frame 22 relative to the head end 32 of the upper frame 22 (i.e., a reverse Trendelenburg position). The center pedal 99 is operable to simultaneously lower both the head and foot ends 32, 34 of the upper frame 22 relative to the lower frame 22.

As shown in FIGS. 2-3, the lower frame 22 includes a pair of laterally extending head and foot end cross frame members 102, 104, which are longitudinally spaced apart and extend between longitudinally extending left and right side frame members 106, 108. Coupled to each end of the two cross frame members 102, 104 is an outwardly-extending right angle bracket 110. A respective caster 24 is coupled to each right angle bracket 110. A cross plate (not shown) is attached to the two side frame members 106, 108 near the head end 32 to support the head end hydraulic cylinder 82 and the pump 92. Another cross plate (not shown) is attached to the two side frame members 106, 108 near the foot end 32 to support the foot end hydraulic cylinder 84 and the pump 94. Illustratively, the cross frame members 102, 104 and the side frame members 106, 108 are in the form of extruded tubes having a square cross section, and made from rigid high strength, light weight materials, such as steel or aluminum.

In the illustrated embodiment, the stretcher 20 includes a linkage assembly 235 (FIGS. 2-3) coupled to the lower frame 22 to lower and raise a steering or $5^{th}$ wheel 236 (FIGS. 2-3). The above-mentioned U.S. Pat. No. 5,806,111 discloses an illustrative linkage for lowering and raising a $5^{th}$ wheel. In the illustrated embodiment, all four casters 24 at the respective corners of the lower frame 22 are brake casters. Each brake caster 24 has two modes, namely, a neutral mode and a brake mode. In the neutral mode, the caster wheels 64 are free to swivel about their respective vertical axes 420 (FIG. 8) and, in addition, are free to rotate about their respective horizontal axes 422 (FIG. 8). In the brake mode, however, the caster wheels 64 are neither free to swivel about their respective vertical axes 420, nor they are free to rotate about their respective horizontal axes 422.

In some embodiments, the stretcher 20 does not have a $5^{th}$ wheel. In such embodiments, the stretcher may have three brake casters and one brake-steer caster near the foot end 34 on the left side 36. A brake-steer caster has three modes, namely, a neutral mode, a brake mode and a steer mode. In the neutral mode, the caster wheel of the brake-steer caster, in the same manner as the caster wheel of the brake caster, is free to swivel about its vertical axis and, in addition, is free to rotate about its horizontal axis. In the brake mode, the caster wheel of the brake-steer caster, in the same manner as the caster wheel of the brake caster, is neither free to swivel about its vertical axis, nor it is free to rotate about its horizontal axis. In the steer mode, however, the caster wheel of the brake-steer caster, unlike the caster wheel of the brake caster, is free to rotate about its horizontal axis, but is not free to swivel about its vertical axis.

In the illustrated embodiment of the stretcher 20, the two brake casters 24 near the head end 32 are active brake casters, whereas the two brake casters 24 near the foot end 34 are standard brake casters. As shown in FIGS. 8-12, each active brake caster 24 has a contoured brake shoe 448 in addition to a standard brake shoe 450. On the other hand, each standard brake caster 24 has only a standard brake shoe 450. An example of an active brake caster having a contoured brake shoe and a standard brake shoe is a part number 911819 (2446 XSP 200 R36-32) from Tente Casters, Inc., Hebron, Ky. An example of a standard brake caster having only a standard brake shoe is a part number 911801 (2446 XSP 200 R36-32), also from Tente Casters, Inc.

As shown in FIGS. 2-6, the stretcher 20 includes a caster braking mechanism 100 for blocking the rotation and swiveling movement of the casters wheels 64. The mechanism 100 includes a pair of brake-steer shafts 130, 170. The brake-steer shaft 130 extends longitudinally, whereas the brake-steer shaft 170 extends laterally. A pair of brake-steer butterfly pedals 132, 134 are coupled to the opposite ends 32, 34 of the brake-steer shaft 130. A pair of brake-steer butterfly pedals 176, 178 are coupled to the opposite ends 36, 38 of the brake-steer shaft 170. The brake-steer pedals 132, 134, 176, 178 can be moved to their respective braking positions to prevent movement of the stretcher 20 by blocking the rotation and swiveling movement of the caster wheels 64. From their respective braking positions, the brake-steer pedals 132, 134, 176, 178 can be moved to their respective steering positions allowing free movement of the stretcher 20 by permitting the rotation and swiveling movement of the caster wheels 64 and by lowering the steering wheel 236 to engage the floor 50. From their respective steering positions, the brake-steer pedals 132, 134, 176, 178 can be moved to their respective neutral positions at which the casters wheels 64 are free to rotate and swivel and at which the steering wheel 236 is retracted to an intermediate position spaced apart from the floor 50.

Figure 4:
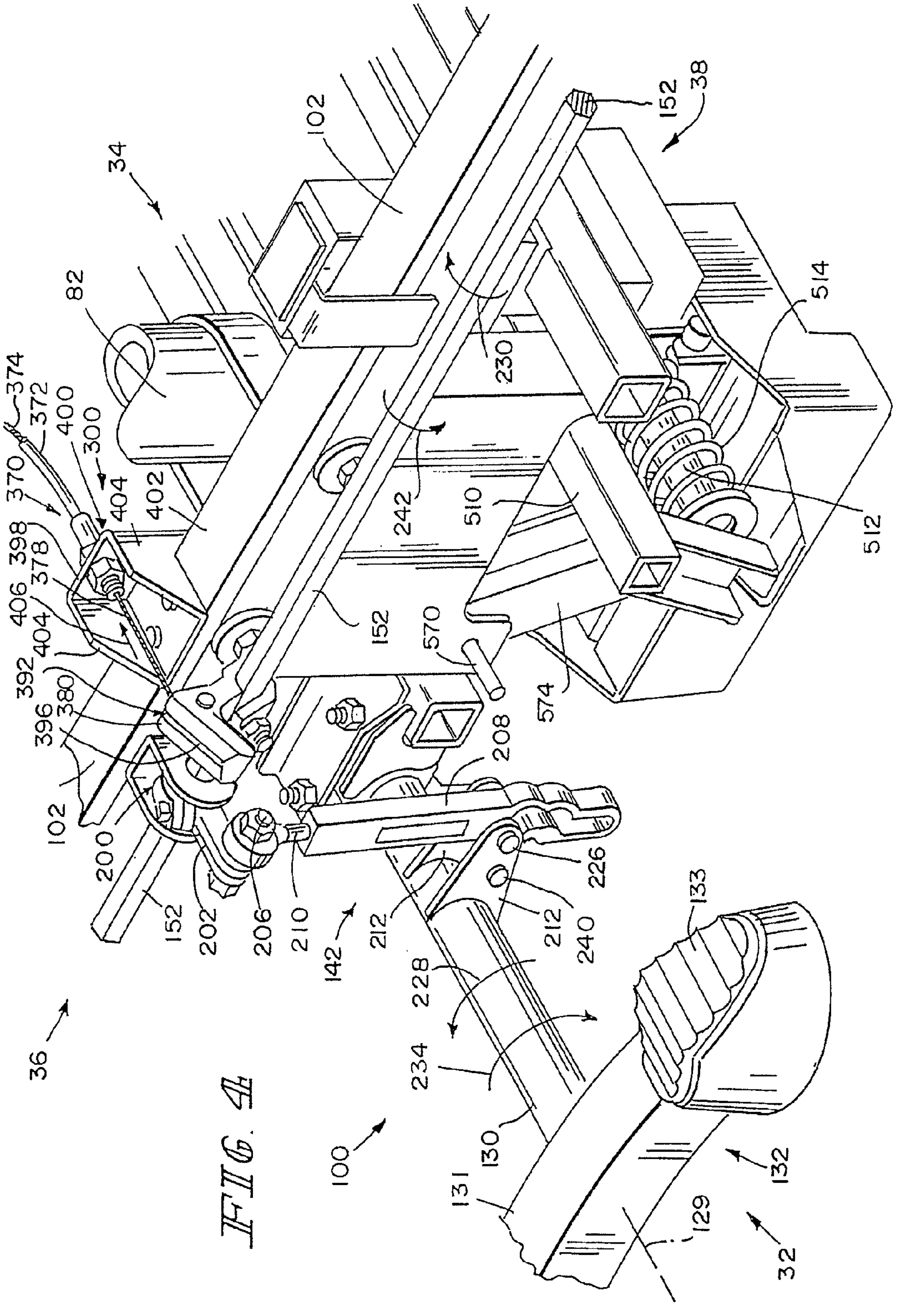
FIG. 4 is an enlarged perspective view of portions of the head end of the lower frame showing, in more detail, a linkage coupling a head end of the longitudinal brake-steer shaft to a lateral brake rod near the head end and showing another linkage coupling the lateral brake rod near the head end to a cable of a hand-actuated caster braking apparatus.
Figure 6:
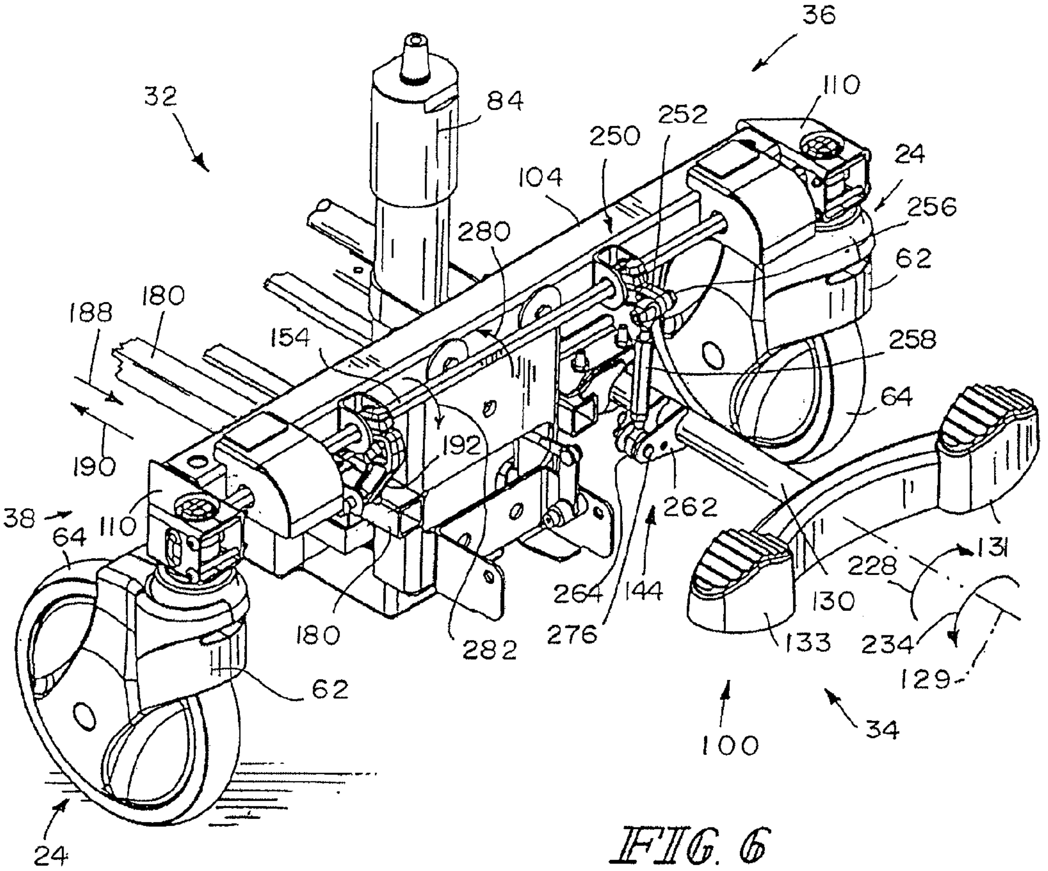
FIG. 6 is an enlarged perspective view of portions of the foot end of the lower frame showing, in more detail, a linkage coupling a foot end of the longitudinal brake-steer shaft to a lateral brake rod near the foot end and showing another linkage coupling the lateral brake rod to the longitudinally-shifting frame member.

The brake-steer shaft 130 is rotatably mounted to the left side frame member 106 of the lower frame 22 by a plurality of brackets 136 (FIG. 2). The longitudinally-extending brake-steer shaft 130 rotates about its longitudinal axis 129 in either direction in response to rotation of either one of the butterfly pedals 132, 134. As shown in FIG. 4, a linkage 142 near the head end 32 couples a head end 32 of the brake-steer shaft 130 to a lateral brake rod 152 having its ends rotatably supported by the right angle brackets 110. As shown in FIG. 6, another linkage 144 near the foot end 34 couples a foot end 34 of the brake-steer shaft 130 to a lateral brake rod 154 having its ends rotatably supported by the right angle brackets 110. Illustratively, each brake rod 152, 154 has a hexagonal cross section, although other configurations of the brake rods 152, 154 are within the scope of this disclosure.

As shown in FIG. 3, the lateral brake-steer shaft 170 is rotatably mounted crosswise to the left and right side frame members 106, 108 near the head end 32 of the lower frame 22 by a pair of collars or brackets 172. The laterally-extending brake-steer shaft 170 rotates about its longitudinal axis 169 in either direction in response to rotation of either one of the butterfly pedals 176, 178. As shown in FIGS. 2-3, on the right side 38 of the lower frame 22, a pivot link 864 is mounted on the brake-steer shaft 170 for rotation therewith. Also, on the right side 38 of the lower frame 22, a longitudinally-shifting frame member 180 (FIGS. 2-3) is coupled to the lower frame 22 for translation in a direction parallel to the longitudinal axis 40. A head end 32 of the frame member 180 carries a coupler 182 that has a pair of laterally-spaced flanges 184. As shown in FIG. 2, the pivot link 864 is received between the laterally-spaced flanges 184, and pivotally coupled thereto by a laterally extending pin 186.

Still referring to FIG. 3, as the brake-steer shaft 170 rotates in a braking direction 194 (clockwise direction as viewed from the right side 38 in FIG. 3), the link 864 also rotates in the braking direction 194 to shift the frame member 180 toward the foot end 34 in a direction indicated by arrow 188 (FIGS. 3 and 6). On the other hand, as the brake-steer shaft 170 rotates in a steering direction 196 (counterclockwise direction as viewed from the right side 38 in FIG. 3), the link 864 also rotates in the steering direction 196 to shift the frame member 180 toward the head end 32 in a direction indicated by arrow 190 (FIGS. 3 and 6). A bracket 192 (FIG. 6) couples the foot end 34 of the frame member 180 to the lateral brake rod 154 near the foot end 34 on the right side 38 of the lower frame 22. Thus, the frame member 180 has its head end 32 supported by link 864 (FIGS. 2-3) coupled to the brake-steer shaft 170 and its foot end 34 supported by the bracket 192 (FIG. 6) coupled to the brake rod 154.

As indicated above, the linkage 142 couples the head end 32 of the brake-steer shaft 130 to the lateral brake rod 152 supported by the right angle brackets 110 near the head end 32. Referring to FIG. 4, the linkage 142 includes a coupler 200 mounted to the brake rod 152 for rotation therewith intermediate of the two right angle brackets 110 that are coupled to the head end cross frame member 102. The coupler 200 includes a link 202 that extends outwardly. The link 202 carries a lateral pivot pin 206. A vertically-extending connecting rod 208 has an upper end coupled to the pivot pin 206 by an eyebolt 210 and a lower end coupled to a pair of longitudinally-spaced short flanges 212 mounted on the brake-steer shaft 130 near the head end 32 for rotation therewith.

Figure 5:
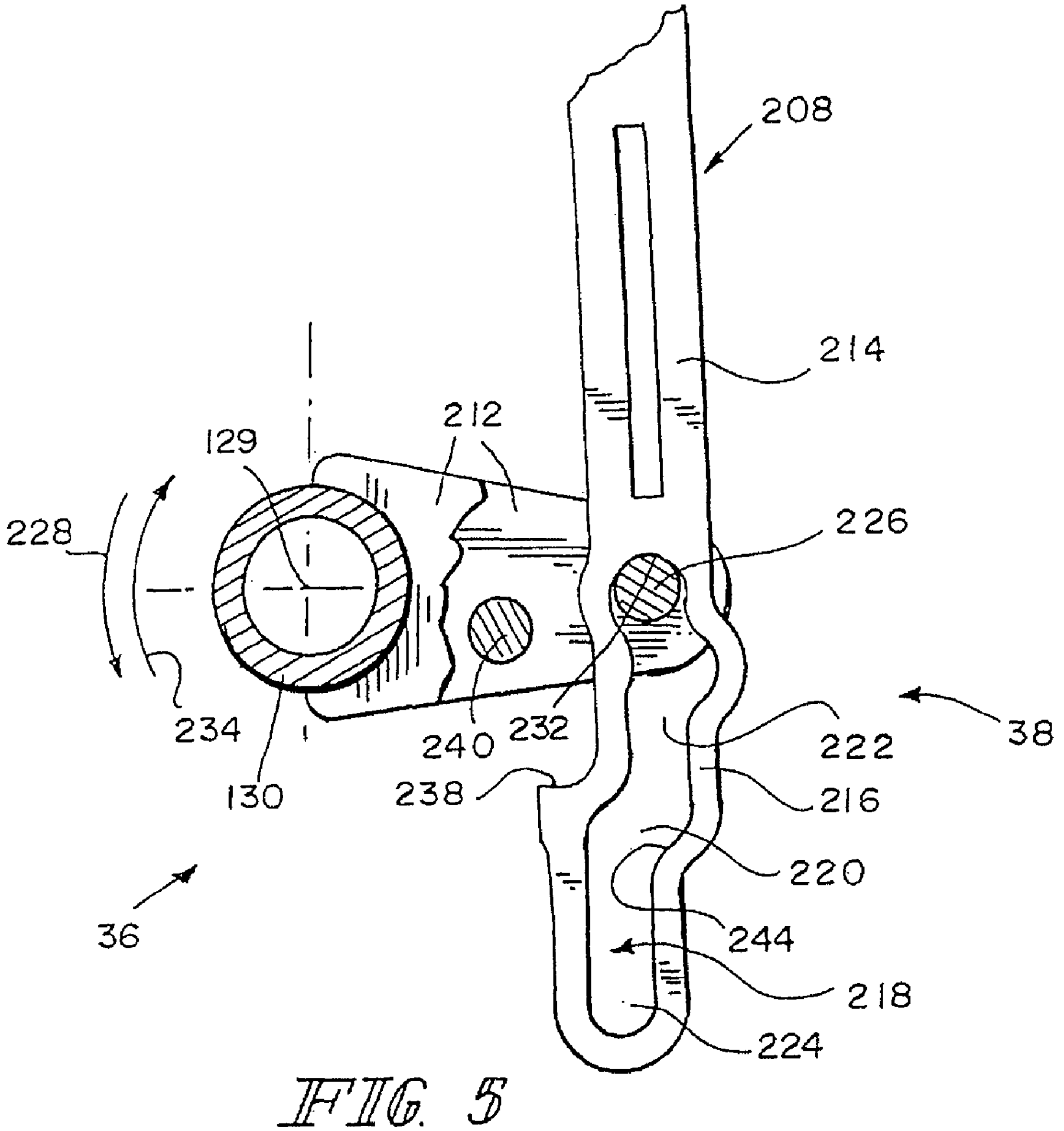
FIG. 5 is an end view showing a connection between a short flange coupled to the brake-steer shaft and a connecting rod coupled to the lateral brake rod near the head end, the connecting rod having a generally vertically-extending slot in which a pin extending from the short flange is received.

As shown in FIG. 5, the connecting rod 208 has a generally straight upper portion 214 and a dogleg-shaped lower portion 216 that is laterally offset. The dogleg-shaped lower portion 216 has a generally vertically-extending slot 218. The slot 218 comprises a downwardly-sloping laterally-extending portion 220, an upwardly-extending portion 222, and a downwardly-extending portion 224. As shown in FIG. 5, the downwardly-extending portion 224 of the dogleg-shaped slot 218 is laterally offset relative the upwardly-extending portion 222 of the dogleg-shaped slot 218. An upwardly-facing seat portion 238 is formed at the junction of the upwardly-extending portion 222 of the dogleg-shaped slot 218 and the downwardly-extending portion 224 of the dogleg-shaped slot 218. A longitudinal pin 226 coupled to the flanges 212 rides in the slot 218.

Figure 10:
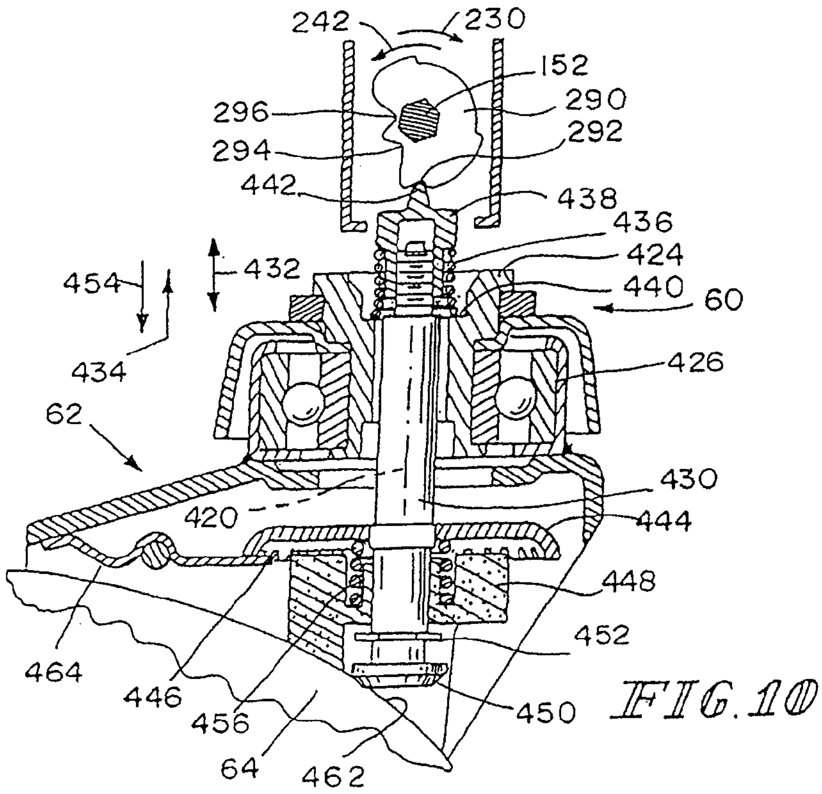
FIG. 10 is a cross-sectional view, similar to FIGS. 8-9, showing the cam rotated about 45 degrees in the clockwise braking direction from its position shown in FIG. 9 to cause both brake shoes to engage the caster wheel.

From a generally horizontal neutral position shown in FIGS. 2-4, a caregiver depresses a braking portion 131 of the brake-steer pedal 132 to rotate the brake-steer shaft 130 about its longitudinal axis 129 in a braking direction 228 (counterclockwise direction as viewed from head end 32 in FIG. 4) to a braking position. The rotation of the brake-steer shaft 130 in the braking direction 228 causes the flanges 212 to also rotate in the braking direction 228. As shown in FIG. 5, when the flanges 212 rotate in the braking direction 228, the pin 226 fixed to the flanges 212 engages a downwardly-facing surface 232 of the upwardly-extending slot 222 to lift the connecting rod 208. Upward motion of the connecting rod 208 results in rotation of the brake rod 152 in a braking direction 230 (clockwise direction as viewed from the right side 38 in FIG. 4). As shown in FIG. 10, rotation of the brake rod 152 in the braking direction 230 moves a pair of contoured brake shoes 448, in addition to a pair of standard brake shoes 450, into engagement with the associated caster wheels 64 near the head end 32 to block their rotation and swiveling movement.

As the brake-steer shaft 130 rotates in the braking direction 228 to its braking position, a longitudinal pin 240 (FIG. 5) mounted on the short flanges 212 engages the upwardly-facing seat portion 238 (FIG. 5) of the connecting rod 208. From its braking position, the brake-steer shaft 130 rotates in the steering direction 234 to its neutral position. As the brake-steer shaft 130 rotates in the steering direction 234 to its neutral position, the longitudinal pin 240 pushes down on the upwardly-facing seat portion 238 to move the connecting rod 208, and the brake rod 152 coupled thereto, to their respective neutral positions shown in FIG. 5. Thus, the longitudinal pin 240 ensures that the connecting rod 208 does not get hung up in its raised position.

On the other hand, from the neutral position, the caregiver depresses a steering portion 133 (FIG. 4) of the brake-steer pedal 132 to rotate the brake-steer shaft 130 about its longitudinal axis 129 in a steering direction 234 (clockwise direction as viewed from head end 32 in FIG. 4) to a steering position. Rotation of the brake-steer shaft 130 in the steering direction 234 causes the linkage assembly 235 (FIG. 2) to move the steering wheel 236 (FIG. 2) into engagement with the floor 50. In addition, as shown in FIG. 4, the rotation of the brake-steer shaft 130 in the steering direction 234 results in the rotation of the flanges 212 in the steering direction 234. Rotation of the flanges 212 in the steering direction 234 causes the pin 226 to initially move downwardly in the upwardly-extending slot 222, then outwardly in the slot 220, and then downwardly in the downwardly-extending slot 224.

As indicated above, the linkage 144 couples a foot end 34 of the brake-steer shaft 130 to the lateral brake rod 154 supported by the right angle brackets 110 near the foot end 34. Referring to FIG. 6, the foot end linkage 144 includes a coupler 250 mounted to the brake rod 154 for rotation therewith intermediate of the two right angle brackets 110 that are coupled to the foot end cross frame member 104. The coupler 250 includes a link 252 that extends outwardly. The link 252 carries a lateral pivot pin 256. A pair of longitudinally-spaced short flanges 262 are fixed to the brake-steer shaft 130 near the foot end 34 for rotation therewith. A longitudinal pivot pin 276 is coupled to the short flanges 262. A connecting rod 258 has an upper end coupled to the pivot pin 256 by an eyebolt, similar to the eyebolt 210, and a lower end coupled to the pivot pin 276 by another eyebolt 264.

From a generally horizontal neutral position shown in FIG. 6, a caregiver depresses a braking portion 131 of the brake-steer pedal 134 to rotate the brake-steer shaft 130 about its longitudinal axis 129 in the braking direction 228 (clockwise direction as viewed from foot end 34 in FIG. 6) to a braking position. The rotation of the brake-steer shaft 130 in the braking direction 228 causes the short flanges 262 to also rotate in the braking direction 228. As the short flanges 262 rotate in the braking direction 228, the pin 276 fixed to the short flanges 262 lifts the connecting rod 258. Upward motion of the connecting rod 258 results in rotation of the brake rod 154 in a braking direction 280 (counterclockwise direction as viewed from the right side 38 in FIG. 6). Rotation of the brake rod 154 in the braking direction 280 moves a pair of standard brake shoes 450 (as shown in FIG. 10 with respect to an active brake caster 24) into engagement with the associated caster wheels 64 near the foot end 34 to block their rotation and swiveling movement. On the other hand, from the neutral position, the caregiver depresses a steering portion 133 of the brake-steer pedal 134 to rotate the brake-steer shaft 130 about its longitudinal axis 129 in the steering direction 234 (counterclockwise direction as viewed from foot end 34 in FIG. 6) to a steering position. As indicated, the rotation of the brake-steer shaft 130 in the steering direction 234 moves the steering wheel 236 (FIG. 2) into engagement with the floor 50.

As shown in FIG. 3, when the brake-steer shaft 170 pivots in the braking direction 194, the frame member 180 shifts toward the foot end 34 in the direction 188. Motion of the frame member 180 toward the foot end 34 in direction 188 results in rotation of the bracket 192 mounted on the brake rod 154 in the braking direction 280 (counterclockwise direction as viewed from the right side 38 in FIG. 6). Rotation of the brake rod 154 in the braking direction 280 moves the standard brake shoes 450 (as shown in FIG. 10 with respect to an active brake caster 24) into engagement with the associated caster wheels 64 near the foot end 34 to block their rotation and swiveling movement. As indicated, the brake casters 24 near the foot end 34 have the standard brake shoes 450. In contrast, the brake casters 24 near the head end 32 have the contoured brake shoes 448 in addition to the standard brake shoes 450.

In addition, as shown in FIG. 6, the rotation of the brake rod 154 in the braking direction 280 causes rotation of the coupler 250 mounted thereon in the braking direction 280. Rotation of the coupler 250 in the braking direction 280 results in the rotation of the brake-steer shaft 130 in the braking direction 228. Rotation of the brake-steer shaft 130 in the braking direction 228 results in the rotation of the brake rod 152 near the head end 32 in the braking direction 230. As shown in FIG. 10, rotation of the brake rod 152 in the braking direction 230 moves the two contoured brake shoes 448, in addition to the two standard brake shoes 450, into engagement with the associated caster wheels 64 near the head end 32 to block their rotation and swiveling movement. Moreover, the rotation of the brake-steer shaft 130 in the braking direction 228 results in the rotation of the brake-steer pedals 132, 134 in the braking direction 228.

On the other hand, as shown in FIG. 3, when the brake-steer shaft 170 pivots in the steering direction 196, the frame member 180 shifts toward the head end 32 in a direction indicated by arrow 190. Motion of the frame member 180 toward the head end 32 results in rotation of the bracket 192 mounted on the brake rod 154 in the steering direction 282 (clockwise direction as viewed from the right side 38 in FIG. 6). Rotation of the bracket 192 in the steering direction 282 results in rotation of the brake rod 154 in the steering direction 282. Rotation of the brake rod 154 in the steering direction 282 causes rotation of the coupler 250 mounted thereon in the steering direction 282. Rotation of the coupler 250 in the steering direction 284 results in the rotation of the brake-steer shaft 130 in the steering direction 234. Rotation of the brake-steer shaft 130 in the steering direction 234 moves the steering wheel 236 (FIG. 2) into engagement with the floor 50. Moreover, the rotation of the brake-steer shaft 130 in the steering direction 234 results in the rotation of the brake-steer pedals 132, 134 in the steering direction 234.

Thus, the rotation of the brake-steer pedals 176, 178 in the braking direction 194 to their respective braking positions results in the rotation of the brake-steer pedals 132, 134 in the braking direction 228 to their respective braking positions. On the other hand, the rotation of the brake-steer pedals 176, 178 in the steering direction 196 to their respective steering positions results in the rotation of the brake-steer pedals 132, 134 in the steering direction 234 to their respective steering positions. Conversely, the rotation of the brake-steer pedals 132, 134 in the braking direction 228 to their respective braking positions results in the rotation of the brake-steer pedals 176, 178 in the braking direction 194 to their respective braking positions. On the other hand, the rotation of the brake-steer pedals 132, 134 in the steering direction 234 to their respective steering positions results in the rotation of the brake-steer pedals 176, 178 in the steering direction 196 to their respective steering positions.

In other words, the foot pedals 132, 134 at the ends 32, 34 of the lower frame 22 are movable about a longitudinal axis

129 that is perpendicular to a lateral axis 169 about which the foot pedals 176, 178 at the sides 36, 38 of the lower frame 22 are movable. A linkage (including, for example, the pivot link 864, the longitudinally-shifting member 180, the bracket 192, the brake rod 154, the linkage 144) interconnecting the foot pedals 132, 134 and the foot pedals 176, 178 is operable to move each of the foot pedals 132, 134 in response to movement of any one of the foot pedals 176, 178 and is operable to move each of the foot pedals 176, 178 in response to movement of any one of the foot pedals 132, 134.

The caster braking mechanism 100 includes a cam 290 mounted on each end of each brake rod 152, 154 in the manner indicated in FIG. 8 with respect to the brake rod 152 near the head end 32. The cam 290 has three notches 292, 294, 296 (FIG. 12) that correspond to its three angular positions, which, in turn, correspond to the braking, neutral and steering positions of the brake-steer pedals 132, 134, 176, 178. A plunger 430 is spring loaded upwardly toward the cam 290 in a direction 434 by a compression spring 436. The spring-loaded plunger 430 has an upwardly-facing tip 442 that is configured to be received in one of the three downwardly-facing notches 292, 294, 296 in the cam 290 depending upon whether the brake rod 152 is in its braking, neutral and steering positions, respectively. The spring 436 is held in a state of compression between a collar 438 carried by the plunger 430 and a plunger housing 424 carried by the stem 60 of the caster 24.

When the brake-steer pedals 132, 134, 176, 178 are in their respective neutral positions, the tips 442 of the plungers 430 are received in the respective central notches 294 in the associated cams 290 mounted on the brake rods 152, 154, as shown in FIG. 8 with respect to the caster 24 near the head end 32 on the right side 38 of the stretcher 20. From their neutral positions, the brake-steer pedals 132, 134, 176, 178 can be rotated to their respective braking positions to, in turn, rotate the brake rods 152, 154 about 45 degrees in the respective braking directions 230, 280 (FIGS. 4 and 6, respectively). Rotation of the brake rods 152, 154 through about 45 degrees in the braking directions 230, 280 results in the rotation of the cams 290 through about 45 degrees in the respective braking directions 230, 280. As the cams 290 rotate about 45 degrees in the respective braking directions 230, 280, the tips 442 of the plungers 430 engage the notches 292 in the associated cams 290 to maintain the positions of the brake rods 152, 154 and the brake pedals 132, 134, 176, 178 in their respective braking positions, as shown in FIG. 10 with respect to the caster 24 near the head end 32 on the right side 38 of the stretcher 20.

In addition, as shown in FIG. 10, the rotation of the cams 290 through about 45 degrees in the respective braking directions 230, 280 causes the edges 298 (FIG. 12) of the cams 290 to press down on the plungers 430 in a downward direction indicated by arrow 454 to cause all four standard brake shoes 450, in addition to the two contoured brake shoes 448 near the head end 32, to engage the associated caster wheels 64 to block their rotation and swiveling movement. On the other hand, from their respective neutral positions, the brake-steer pedals 132, 134, 176, 178 can be rotated to their respective steering positions to, in turn, rotate the brake rods 152, 154 about 45 degrees in their respective steering directions 242, 282 (FIGS. 4 and 6, respectively). Rotation of the brake rods 152, 154 through about 45 degrees in the steering directions 242, 282 results in the rotation of the cams 290 through about 45 degrees in the respective steering directions 242, 282. As the cams 290 rotate about 45 degrees in the respective steering directions 242, 282, the tips 442 of the plungers 430 engage the notches 296 in the associated cams 290 to maintain the positions of the brake rods 152, 154 and the brake pedals 132, 134, 176, 178 in their respective steering positions.

As indicated above, the left and right push handles 66, 68 are coupled to the upper frame 22 near the head end 32 for movement between the raised push positions and the lowered storage positions. The push handle 66 is located on the left side 36 of the upper frame 22, whereas the push handle 68 is located on the right side 38 of the upper frame 22. When the push handles 66, 68 are locked in their respective raised positions, the handle posts 70 of the push handles 66, 68 extend laterally inwardly relative to upwardly-extending portions 76 of the associated extension posts 72 of the push handles 66, 68 generally perpendicularly to the longitudinal axis 40 of the stretcher 20, as shown, for example, in FIGS. 1 and 7 with respect to the push handle 68. The caregiver can then grip the handle posts 70 of the two push handles 66, 68 to maneuver the stretcher 20 along the floor 50.

The stretcher 20 includes a hand-actuated caster braking apparatus 300 as shown in FIGS. 4 and 7. The apparatus 300 includes a brake handle 302 coupled to the handle post 70 of one of the push handles 66, 68. In the illustrated embodiment, the brake handle 302 is coupled to the push handle 68, which is the push handle on the right side of a caregiver standing near the head end 32 of the stretcher 20. The brake handle 302 is pivotally mounted to a mounting bracket 304 by a screw 306 for pivoting movement about a pivot axis 308. The mounting bracket 304 is, in turn, secured to the handle post 70 of the push handle 68 by a screw 310. When the brake handle 302 is mounted to the handle post 70 of the push handle 68, the pivot axis 308 extends generally vertically relative to the upper frame 22 and the brake handle 302 extends generally laterally outwardly as shown in FIG. 7.

Illustratively, as shown in FIG. 7, the brake handle 302, the mounting bracket 304, the handle post 70 and the upwardly-extending portion 76 of the push handle 68 are all encased in a soft sleeve or cover 312 to provide a comfortable grip and to improve cleanability. The end portion of the assembly is closed off by an end cap 314. In the illustrated embodiment, the end cap 314 has a two-piece clamshell construction comprising top and bottom shells or halves 316, 318. In the illustrated embodiment, the brake handle 302 and the mounting bracket 304 are made from rigid high strength, light weight material, such as steel or aluminum. The end cap 314 is made from rigid high strength, light weight plastic material. The sleeve 312 is made of rubber or plastic. In some embodiments, the brake handle 302, the mounting bracket 304, the handle post 70 and the upwardly-extending portion 76 of the push handle 68 are dip molded to provide a suitable soft covering.

As shown in FIG. 7, the brake handle 302 includes a hub portion 320, a handgrip portion 322 and a leg portion 324. When the brake handle 302 is mounted to the handle post 70, the handgrip portion 322 extends generally laterally outwardly and the leg portion 324 extends generally longitudinally outwardly relative to the hub portion 320. In the illustrated embodiment, the angle formed between the handgrip portion 322 and the leg portion 324 is an obtuse angle (about 100 degrees). In some embodiments, the angle formed between the handgrip portion 322 and the leg portion 324 is about 90 degrees. In some other embodiments, the angle formed between the handgrip portion 322 and the leg portion 324 is less than 90 degrees.

As indicated, the end cap 314 comprises top and bottom shells 316, 318. The top and bottom shells 316, 318 each has a generally rectangular configuration in plan view. Illustratively, the top and bottom shells 316, 318 are generally mirror images of each other. Each shell 316, 318 has a plurality of reinforcing ribs (not shown) and a pair of mounting posts 326, 328. The reinforcing ribs and the mounting posts 326, 328 define a generally flat surface that is spaced inwardly from a generally flat surface defined by a rim portion 330 of the shell 316, 318 to form a cavity 332 for receiving the hub and leg portions 320, 324 of the brake handle 302 and to form an opening 334 through which the handgrip portion 322 of the brake handle 302 extends laterally outwardly. The mounting post 328 in the top shell 316 has an oversized through opening 336. The mounting post 328 in the bottom shell 318 has a threaded blind opening 338.

Still referring to FIG. 7, the mounting bracket 304 has a tubular cylindrical body 340 and a pair of spaced-apart flanges 342 that extend outwardly from the cylindrical body 340 in a direction generally perpendicularly to a longitudinal axis of the cylindrical body 340. The outer diameter of the cylindrical body 340 is slightly smaller than the inner diameter of the tubular handle post 70 of the push handle 68. To secure the mounting bracket 304 to the handle post 70, the cylindrical body 340 of the bracket 304 is inserted into the tubular handle post 70. The screw 310 is then inserted through an oversized opening 344 in the handle post 70 and screwed into a threaded opening 346 in the mounting bracket 304. When the mounting bracket 304 is installed, the spaced-apart flanges 342 extend horizontally from the cylindrical body 340 toward the foot end 34 of the stretcher 20.

To secure the brake handle 302 to the mounting bracket 304, the hub and leg portions 320, 324 of the brake handle 302 are positioned between the spaced-apart flanges 342. The screw 306 is then inserted through the oversized opening 336 in the mounting post 328 of the top shell 316, through a first washer 348, through an oversized opening 350 in the top flange 342, through an oversized opening 352 in the hub portion 320 of the brake handle 302, through an oversized opening 350 in the bottom flange 342, and then through a second washer 348. The screw 306 is then screwed into the threaded opening 338 in the mounting post 328 of the bottom shell 318. When the brake handle 302 is installed, the hub and leg portions 320, 324 of the brake handle 302 reside substantially within the footprint of the spaced-apart flanges 342 of the mounting bracket 304 so as not to negatively affect the movement of the brake handle 302. When the brake handle 302 is installed, the top shell 316 houses a top half of the hub and leg portions 320, 324 of the brake handle 302, whereas the bottom shell 318 houses a bottom half of the hub and leg portions 320, 324 of the brake handle 302.

It is understood that although screws 306, 310 are used in the illustrated embodiment to pivotally mount the brake handle 302 to the mounting bracket 304 and to secure the mounting bracket 304 to the handle post 70, other suitable fasteners, such as dowel pins, rivets, nut and bolt combinations, may instead be used to pivotally mount the brake handle 302 to the mounting bracket 304 and to secure the mounting bracket 304 to the handle post 70. Also, it is understood that although a mounting bracket 304 is used in the illustrated embodiment to pivotally mount the brake handle 302 to the handle post 70, a single right angle flange may instead be used to pivotally mount the brake handle 302 to the handle post 70.

As shown in FIG. 7, in the illustrated embodiment, the caster braking apparatus 300 includes a Bowden cable 370 having a sheath 372 and an elongated wire 374 slidably received therein. The wire 374 has a first end 376 (FIG. 7) coupled to the leg portion 324 of the brake handle 302 and a second end 378 (FIG. 4) coupled to a lever 380 mounted on the brake rod 152 near the head end 32 for rotation therewith. The leg portion 324 of the brake handle 302 has an upwardly-extending aperture 382 near its distal end. A small cylinder 384 is attached to the first end 376 of the wire 374. The cylinder 384 has a diameter that is larger than a diameter of the aperture 382. The wire 374 is threaded into the aperture 382 through an outwardly-opening slot in communication with the aperture 382. The wire 374, which is in tension, pulls the cylinder 384 against an annular lip of the aperture 382 to secure the first end 376 of the wire 374 to the leg portion 324 of the brake handle 302. The sheath 372 is attached to the mounting bracket 304 at a convenient location.

As shown in FIG. 4, the lever 380 mounted on the brake rod 152 has an aperture 392 near its distal end. A small cylinder, similar to the cylinder 384, is attached to the second end 378 of the wire 374. The cylinder, attached to the second end 378 of the wire 374, has a diameter that is larger than a width of the aperture 392. The wire 374 is threaded into the aperture 392 through an outwardly-opening slot 396 in communication with the aperture 392. The wire 374, which is in tension, pulls the cylinder against an annular lip of the aperture 392 to secure the second end 378 of the wire 374 to the lever 380 mounted on the brake rod 152 for rotation therewith. The sheath 372 is attached to an upwardly-extending flange 398 of a bracket 400 mounted on an upwardly-facing surface 402 of the lateral cross rail 102 of the lower frame 22 near the head end 32. The bracket 400 includes two laterally-spaced side plates 404 on opposite sides 36, 38 of the upwardly-extending flange 398.

From its connection to the leg portion 324 (FIG. 7) of the brake handle 302, the cable 370 is routed through an interior region of the handle post 70, routed through the bends 78 (FIG. 7) in the push handle 68 and then exits the push handle 68 through its bottom portion 80 (FIG. 7). After the cable 370 exits the bottom portion 80 of the push handle 68 near the head end 32 on the right side 38 of the stretcher 20, it is routed inwardly along the upper frame 22, routed downwardly along the hydraulic cylinder 82 near the head end 82, and then routed outwardly along the lower frame 22 to the lever 380 mounted on the brake rod 152 near the head end 32.

Figure 9:
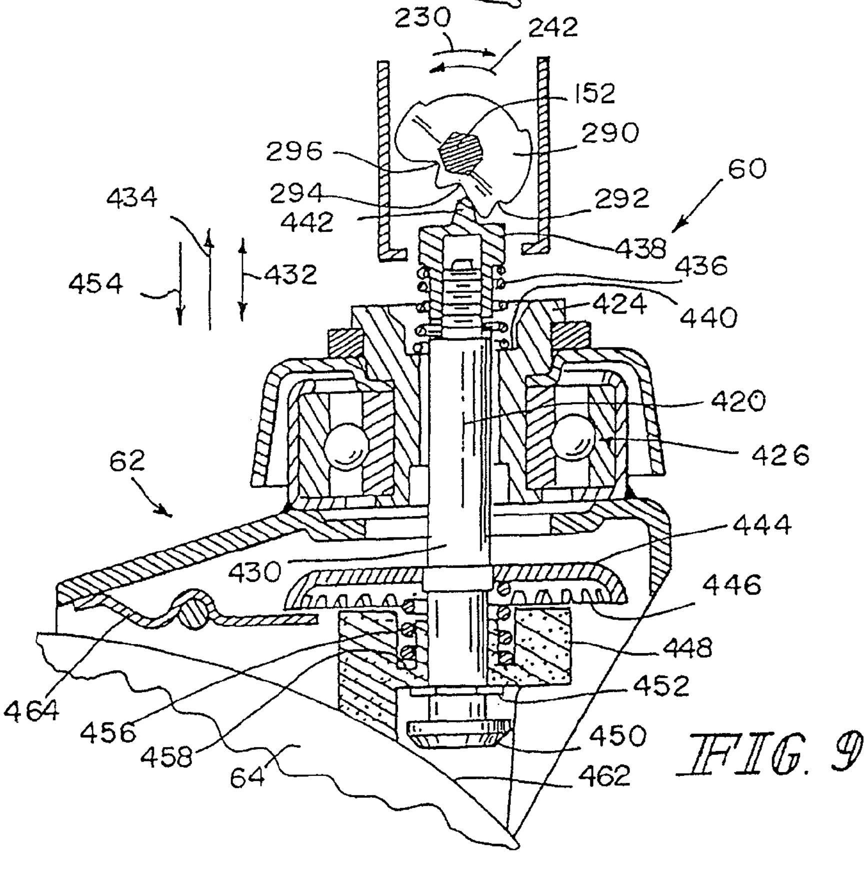
FIG. 9 is a cross-sectional view, similar to FIG. 8, showing the cam rotated about 28 degrees in the clockwise braking direction from its position shown in FIG. 9 to cause the contoured brake shoe to engage the caster wheel.

As shown in FIG. 1, the brake handle 302 is sufficiently close to the handle post 70 to allow a caregiver to simultaneously grasp the handle post 70 and the handgrip portion 322 of the brake handle 302 and squeeze the handgrip portion 322 to pull the wire 374 in a direction indicated by arrow 406 (FIG. 4) to cause the lever 380, and the brake rod 152 coupled thereto, to rotate in the braking direction 230 through an angle of up to about 28 degrees. Rotation of the brake rod 152 in the braking direction 230 through an angle close to about 28 degrees moves the two contoured brake shoes 448, but not the two standard brake shoes 450, into engagement with the associated caster wheels 64 near the head end 32, as shown in FIG. 9, to impede their rotation, but not block their rotation. In the illustrative embodiment, the amount of force a typical caregiver can exert on the brake handle 302 does not permit the brake rod 152 to rotate more than about 28 degrees when the brake handle 302 is actuated.

However, when the brake-steer pedals 132, 134, 176, 178 are rotated to their respective braking positions, the brake rods 152, 154 are rotated through about 45 degrees in their respective braking directions 230, 280 to move all four standard brake shoes 450, in addition to the two contoured brake shoes 448 near the head end 32, into engagement with the associated caster wheels 64 with a force that is sufficiently large to block their rotation as shown in FIG. 10. In addition, the rotation of the brake-steer pedals 132, 134, 176, 178 to their respective braking positions causes the tips 442 of the plungers 430 to engage the notches 292 in the associated cams 290 mounted on the brake rods 152, 154 to hold the brake rods 152, 154, and the brake pedals 132, 134, 176, 178 coupled thereto, in their respective braking positions.

On the other hand, when the brake handle 302 is actuated, only the head end brake rod 152 rotates through an angle of up to about 28 degrees. Rotation of the brake rod 152 through an angle close to about 28 degrees causes only the two contoured brake shoes 448, but not the two standard brake shoes 450, near the head end 32 to engage the associated caster wheels 64 with a force that is sufficiently large to impede their rotation, but not large enough to block their rotation, as shown in FIG. 9. Moreover, the rotation of the brake rod 152 through an angle of up to about 28 degrees results in the rotation of cams 290 mounted thereon through an angle of up to about 28, not enough to allow the tips 442 of the plungers 430 to engage the notches 292 in the respective cams 290 mounted on the brake rod 152. The plungers 430, which are spring loaded upwardly, exert forces on the cams 290 mounted on the brake rod 152 to urge the brake rod 152 to return to its neutral position when the brake handle 302 is released. As the brake rod 152 returns to its home or neutral position, the handgrip portion 322 of the brake handle 302 also returns to its home position. In some embodiments, an additional spring, such as a torsion spring, may be provided to urge the brake handle 302 to return to its extended position.

As shown in FIG. 4, the rotation of the brake rod 152 in the braking direction 230 in response to the actuation of the brake handle 302 results in the rotation of the coupler 200 mounted thereon in the braking direction 230. Rotation of the coupler 200 in the braking direction 230 results in the upward movement of the connecting rod 208. As shown in FIG. 5, the pin 226 mounted on the flanges 212 carried by the brake-steer shaft 130 is sufficiently spaced from an upwardly-facing surface 244 of the upwardly-extending slot 222 to allow the connecting rod 208 to move upwardly without also causing the rotation of the brake-steer shaft 130 in response to the rotation of the brake rod 152 when the brake handle 302 is actuated. Since the brake-steer shaft 130 is not rotated in response to the actuation of the brake handle 302, the brake rod 154 near the foot end 34, the brake-steer shaft 170, and the brake pedals 132, 134, 176, 178 are also not rotated in response to the actuation of the brake handle 302.

As shown in FIGS. 8-12, a cam 290 is mounted on the brake rod 152. The cam 290 has three notches 292, 294, 296 that correspond to its three angular positions, which, in turn, correspond to the braking, neutral and steering positions of the brake-steer pedals 132, 134, 176, 178. The caster 24 has a stem 60, a yoke 62 carried by the stem 60 for pivoting movement about a generally vertical axis 420 and a wheel 64 carried by the yoke 62 for rotation about a generally horizontal axis 422 (FIG. 1). The stem 60 of the caster 24 is fixedly attached to the right angle bracket 110 (FIG. 2) of the lower frame 22. The stem 60 includes a plunger housing 424. The yoke 62 is mounted for swiveling movement relative to the plunger housing 424 via a bearing 426. The bearing 426 has an inner race coupled to the plunger housing 424 and an outer race coupled to the yoke 62 via a bearing housing 428. In some embodiments, the yoke 62 may not rotate relative to the stem 60 about the vertical axis 420.

A plunger 430 is supported by the plunger housing 424 for reciprocating movement in opposite directions indicated by a double-headed arrow 432 along the vertical axis 420. While the plunger 430 is free to move vertically, it is prevented from rotating relative to the plunger housing 424. The plunger 430 is spring loaded upwardly in direction 434 toward the cam 290 by a compression spring 436. The spring 436 is held in a state of compression between a collar 438 secured to the plunger 430 and an annular seat portion 440 defined by the plunger housing 424. The spring-loaded plunger 430 has a tip 442 that is configured to be received in one of the three notches 292, 294, 296 in the cam 290 depending upon whether the brake rod 152 is in its braking position (FIG. 10), in its neutral position (FIG. 8) and in its steering position (not shown), respectively.

Figure 11:
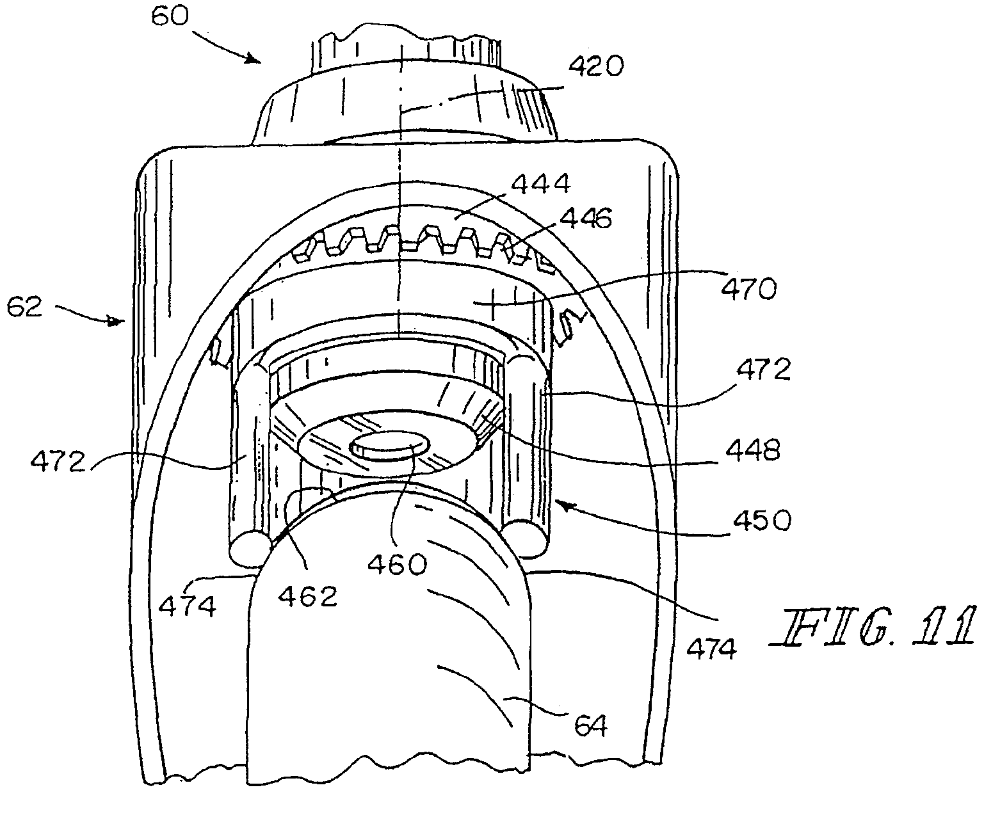
FIG. 11 is an enlarged bottom perspective view corresponding to FIG. 8 showing the brake shoes and the caster wheel.
Figure 12:
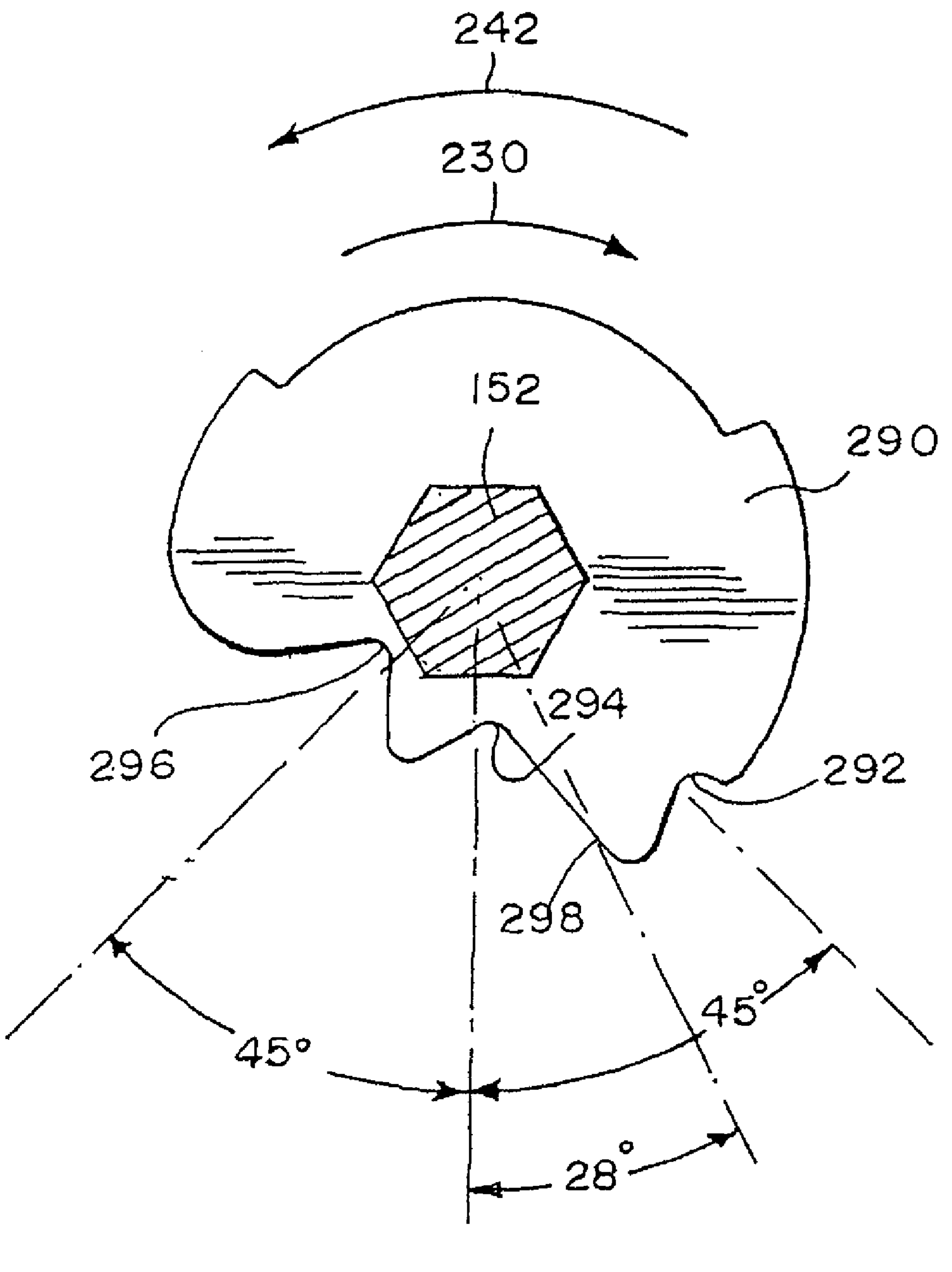
FIG. 12 is a front elevation view of the cam showing three notches corresponding to braking, neutral and steering positions of the caster.

An annular plate 444 is coupled to the plunger 430 and includes a plurality of downwardly-facing teeth 446 about its outer perimeter. A contoured brake shoe 448 is supported by the plunger 430 for movement along the vertical axis 420. In addition, the contoured brake shoe 448 is rotatable relative to the plunger 430 about the vertical axis 420. A retainer 452 secured to the plunger 430 prevents the contoured brake shoe 448 from falling off. The contoured brake shoe 448 is spring loaded downwardly in direction 454 toward the retainer 452 by a compression spring 456. The compression spring 456 is held in a state of compression between the annular plate 442 and an annular seat portion 458 defined by the contoured brake shoe 448. A standard brake shoe 450 is secured to a lower end of the plunger 430 by a screw or stud 460 (FIG. 11). Thus, the caster 24 has the contoured brake shoe 448 that is floating (rotatable and translatable) relative to the plunger 430 and the standard brake shoe 450 that is fixed to the plunger 430.

When the brake rod 152 is in the neutral position as shown in FIG. 8, the plunger tip 442 is received in the notch 294 and both brake shoes 448, 450 are spaced from a tread 462 of the caster wheel 64. As the brake handle 302 is squeezed, the brake rod 152, and the cam 290 coupled thereto, rotate in the braking direction 230 through an angle of up to 28 degrees. As the cam 290 rotates in the braking direction 230, the plunger 430, and the annular plate 442 coupled thereto, are pressed downwardly by the cam 290. As the annular plate 442 travels downwardly, the compression spring 456 urges the contoured brake shoe 448 to engage the tread 462 of the wheel 64 as shown in FIG. 9. As the brake rod 152, and the cam 290 coupled thereto, rotate through an angle close to about 28 degrees (for example, 24 degrees), the contoured brake shoe 448 starts to engage the tread 462 of the wheel 64 as shown in FIG. 9.

As the plunger 430 continues to travel downwardly, the contoured brake shoe 448, which is pressed against the tread 462 by the compression spring 456, is prevented from traveling downwardly while the retainer 452 secured to the plunger 430 continues to travel downwardly as shown in FIG. 10. Additional rotation of the cam 290 increases the deflection of the compression spring 456 which, in turn, results in additional force being applied to the tread 462 by the contoured brake shoe 448. Thus, during at least a portion of the rotation of the cam 290, the compression spring 456 applies an increasing braking force against the tread 462 to allow a user to vary the force exerted on the wheel 64 to control the speed of rotation of the wheel 64. While the actuation of the brake handle 302 impedes the rotation of the two caster wheels 64 near the head end 32, the forces exerted by the contoured brake shoes 448 are not sufficient to block the rotation of the wheels 64. The amount of force exerted by a typical caregiver on the brake handle 302 does not permit the brake rod 152 to rotate more than about 28 degrees. In the state shown in FIG. 10, the wheel 64 is free to swivel about the vertical axis 420 and the contoured brake shoe 448, which is pressed against the tread 462 by the compression spring 456, rotates with the wheel 64 about the vertical axis 420.

However, as shown in FIG. 10, when the brake rod 152, and the cam 290 coupled thereto, rotate through about 45 degrees in the braking direction 230, the plunger 230 causes the standard brake shoe 450, in addition to the contoured brake shoe 448, to engage the tread 462 of the wheel 64 with sufficient force to block the rotation of the wheel 64. In addition, some of the teeth 446 of the annular plate 444 are received in associated holes in a plate 464 carried by the yoke 62 to prevent the wheel 64 from swiveling about the vertical axis 420. As the brake rods 152, and the cams 290 coupled thereto, rotate through an angle of about 45 degrees in the braking direction 230, the plunger tips 442 enters the notches 292 in the associated cams 290 as shown in FIG. 10 to hold the plungers 430, the brake rods 152, 154, brake-steer shafts 130, 170, and the brake pedals 132, 134, 176, 178 in their respective braking positions.

As shown in FIG. 11, each contoured brake shoe 448 has an annular body portion 470 and a pair of curved wheel-engaging flange portions 472 that extend downwardly from the annular body portion 470 on opposite sides of the tread 462. When the plunger 430 is lowered, the wheel engaging flange portions 472 of the brake shoe 448 engage the non-floor engaging surfaces 474 of the wheel 64 on opposite sides of the tread 462. In some embodiments, the teeth 446 of plate 444 may be omitted such that full actuation of the plunger 430 causes the brake shoes 448, 450 to engage the wheels 64, but the wheels 64 are not prevented from swiveling about the vertical axis 420. In some embodiments, the yoke 62 may be fixed to the stem 60 to prevent the wheel 64 from swiveling about the vertical axis 420.

By providing the stretcher 20 with the hand-actuated caster braking apparatus 300, including the brake handle 302 that is squeezed by a caregiver to move the brake shoes 448 into contact with the head end caster wheels 64 to impede their rotation, the caregiver is able to slow the speed at which the stretcher 20, along with any patient and/or equipment carried by the stretcher 20, travels along the floor. Such slowing may be desirable, for example, when turning the stretcher around a corner from one hallway into another hallway or into a room or when the stretcher is being pushed down a ramp in a healthcare facility. When an obese patient is being transported by the stretcher 20, and especially when the stretcher 20 is being pushed down a ramp while carrying an obese patient, the ability of the caregiver to use the hand-actuated caster braking apparatus 300 to slow the speed of the stretcher 20 is a significant improvement over the known prior art stretchers. In fact, because the stretcher 20 has the apparatus 300 for slowing the speed of the stretcher 20 during transport, less caregivers may be needed to transport patients, including obese patients, from one location to another in a healthcare facility than may otherwise be needed, especially if a ramp is encountered along the transport route.

Although a plunger-style caster braking mechanism has been disclosed, use of a hand brake on a push handle to actuate other types of caster or wheel braking mechanisms are within the scope of this disclosure. Examples of such other types of caster or wheel braking mechanisms include mechanisms having a ring that engages the wheel tread, as shown, for example, in U.S. Pat. Nos. 6,264,006; 6,951,034 and 6,460,205 and mechanisms having a brake member that engages the wheel hub, as shown, for example, in U.S. Pat. Nos. 6,865,775; 5,456,336; 5,343,988 and 5,139,116, as well as caster or wheel braking mechanisms having other types of structures that engage the wheel, such as those shown in U.S. Pat. Nos. 5,046,748 and 4,076,266. Furthermore, use of a hand-actuated caster braking mechanism of the type disclosed herein, as well as the alternative hand-actuated caster or wheel braking mechanisms listed above, may be used to brake a 5$^{th}$ or steering wheel (sometimes also referred to as an auxiliary or center wheel), including steering wheels that raise and lower into and out of engagement with a floor and including patient support apparatuses that have more than one steering wheel, in lieu of or in addition to braking the caster wheel. The U.S. Pat. Nos. 6,264,006; 6,951,034; 6,460,205; 6,865,775; 5,456,336; 5,343,988; 5,139,116; 5,046,748 and 4,076,266 are hereby incorporated by reference herein.

As explained above, the elevation adjustment mechanism 28 is operable to raise, lower, and tilt the upper frame 22 relative to the lower frame 22. As shown in FIGS. 2-3, the elevation adjustment mechanism 28 includes head and foot end hydraulic cylinders 82 and 84. The cylinders 82, 84 are coupled to respective hydraulic pumps 92, 94 supported on the lower frame 22. As shown in FIGS. 2-3 and 13-15, coupled to each side of the lower frame 22 are a pump pedal 90, a pair of side pedals 96, 98 and a center pedal 99 supported by the side pedals 96, 98. The pump pedal 90 is operable to raise the upper frame 22 relative to the lower frame 22. The side pedal 96 (also sometimes referred to as a head end pressure release pedal) is operable to lower the head end 32 of the upper frame 22 relative to the foot end 34 of the upper frame 22 (i.e., a Trendelunburg position). The side pedal 98 (also sometimes referred to as a foot end pressure release pedal) is operable to lower the foot end 34 of the upper frame 22 relative to the head end 32 of the upper frame 22 (i.e., a reverse Trendelenburg position). The center pedal 99 is operable to simultaneously lower both the head and foot ends 32, 34 of the upper frame 22 relative to the lower frame 22. As explained below, the center pedal 99 is captured by the side pedals 96, 98 and floats on top of the side pedals 96, 98 without a direct connection to the lower frame 22. In other words, the center pedal 99 is supported by the side pedals 96, 98, which are, in turn, supported by the lower frame 22. This arrangement allows simultaneous lowering of both the head and foot ends 32, 34 of the upper frame 22, as well as individual lowering of either the head or the foot ends 32, 34 of the upper frame 22.

As shown in FIGS. 2-3, a longitudinally-extending reciprocally-mounted bar 510 is coupled to the side frame member 108 on the right side 38 of the lower frame 22 for reciprocating longitudinal movement in opposite directions indicated by a double-headed arrow 516 (FIG. 3). The head end 32 of the reciprocally-mounted bar 510 is coupled to a pump rod 512 (diagrammatically shown in FIG. 18) of the head end hydraulic pump 92. The pump rod 512 is spring loaded toward the head end 32 by a compression spring 514 (diagrammatically shown in FIG. 18). The foot end 34 of the reciprocally-mounted bar 510 is coupled to a pump rod of the foot end hydraulic pump 94, similar to the pump rod 512 of the head end hydraulic pump 92. The pump rod 512 of the foot end hydraulic pump 94 is spring loaded toward the head end 32 by a compression spring, similar to the compression spring 514 of the head end pump rod 512. A linkage 518 (FIGS. 13-15) couples the two pump pedals 90 to the reciprocally-mounted bar 510 such that vertical reciprocating motion of one of the two pump pedals 90 results in horizontal reciprocating motion of the bar 510. An example of such linkage is shown in U.S. Pat. No. 6,421,854, which is hereby incorporated by reference herein.

Figure 18:
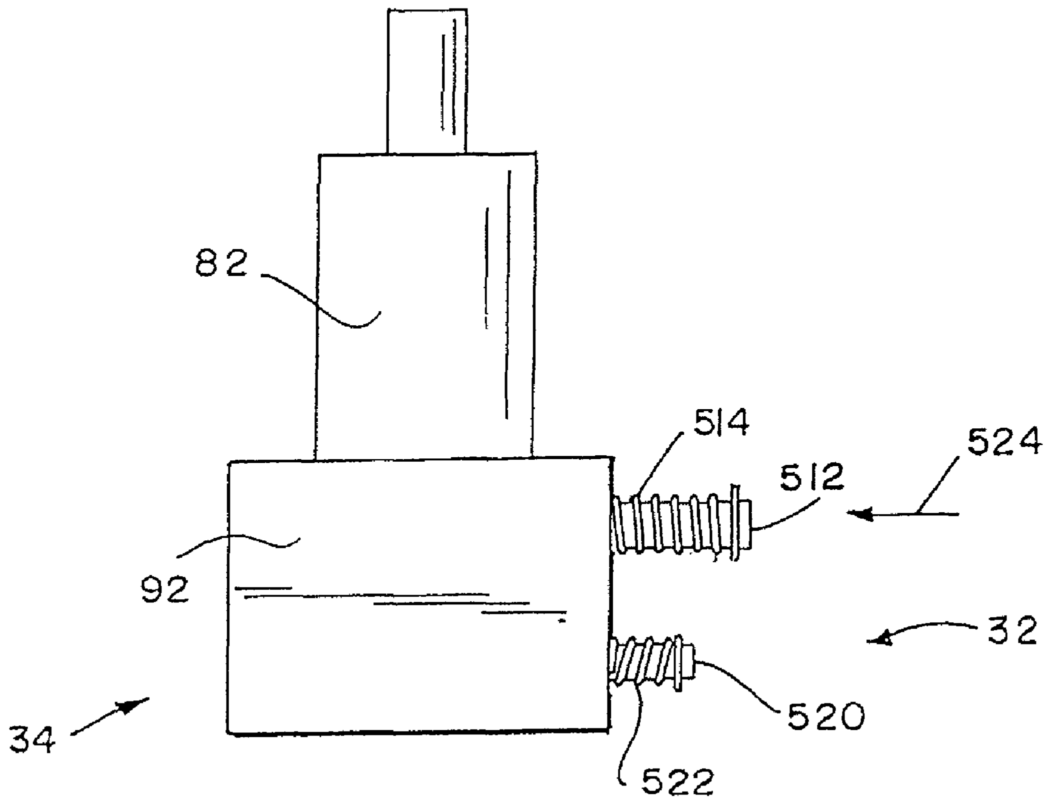
FIG. 18 is a diagrammatic view showing a head end hydraulic cylinder having a pump rod spring that is loaded toward the head end by a compression spring and a pressure release pin that is also spring loaded toward the head end by another compression spring.

Each pump pedal 90 is spring loaded upwardly by return springs 526 to a generally horizontal raised position as shown in FIGS. 1-3 and 13-15. From the raised position, the caregiver can depress the pump pedal 90 to cause the reciprocally-mounted bar 510 to move toward the foot end 34 of the stretcher 20 in a direction 524 (FIG. 18). The bar 510, in turn, causes the head and foot end pump rods 512 to move toward the foot end 34 in the direction 524. The caregiver can then release the pressure on the pump pedal 90 to allow the springs 514 coupled to the pump rods 512 to return the pump rods 512 to their respective starting or home positions near the head end 32. The pump pedal 90, and the reciprocally-mounted bar 510 coupled thereto, are returned to their respective starting or home positions by the return springs 526. The caregiver repetitively depresses the pump pedal 90 to cause reciprocating motion of the bar 510. Reciprocating motion of the bar 510, in turn, causes reciprocating motion of the pump rods 512. Reciprocating motion of the pump rods 512 causes the pumps 92, 94 to pump fluid into the associated hydraulic cylinders 82, 84 to, in turn, cause the upper frame 22 to rise.

The head and foot end hydraulic pumps 92, 94 each include a pressure release pin or button 520, shown diagrammatically in FIG. 18 with respect to the head end hydraulic pump 92. The head and foot end pressure release pins 520 are spring loaded toward the head end 32 by respective compression springs 522, shown diagrammatically in FIG. 18. As one of the two head end side pedals 96 is depressed (the left side pedal 96 is depressed in FIG. 14), a first linkage 530 shown in FIGS. 13-16 actuates the head end pressure release pin 520 to release the pressure in the head end hydraulic cylinder 82 to, in turn, lower the head end 32 of the upper frame 22. The downward travel of the head end 32 of the upper frame 22 stops when the head end side pedal 96 is released. As one of the two foot end side pedals 98 is depressed, a second linkage 630 also shown in FIGS. 13-16 actuates the foot end pressure release pin 520 to release the pressure in the foot end hydraulic cylinder 84 to, in turn, lower the foot end 34 of the upper frame 22. The downward travel of the foot end 34 of the upper frame 22 stops when the foot end side pedal 98 is released. In contrast, as one of the two center pedals 99 is depressed (the left center pedal 99 is depressed in FIG. 15), the two side pedals 96, 98 supporting the center pedal 99 are simultaneously depressed. As the two side pedals 96, 98 are simultaneously depressed, the head and foot ends 32, 34 of the upper frame 22 are evenly lowered. The downward travel of the upper frame 22 stops when the center pedal 99 is released.

Figure 13:
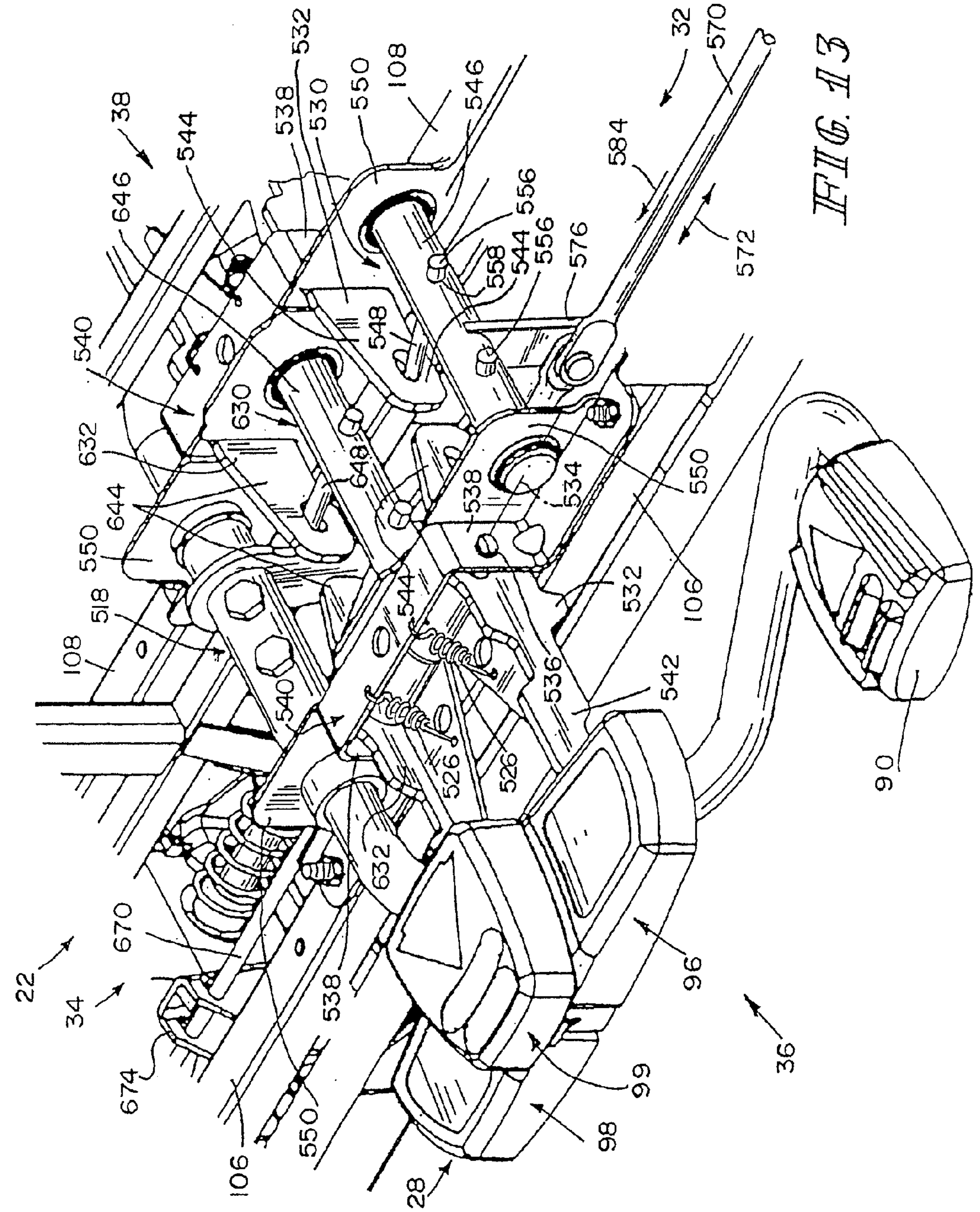
FIG. 13 is an enlarged perspective view of portions of the left side of the lower frame showing, in more detail, a pump pedal, a pair of side pedals and a center pedal supported by the side pedals.
Figure 14:
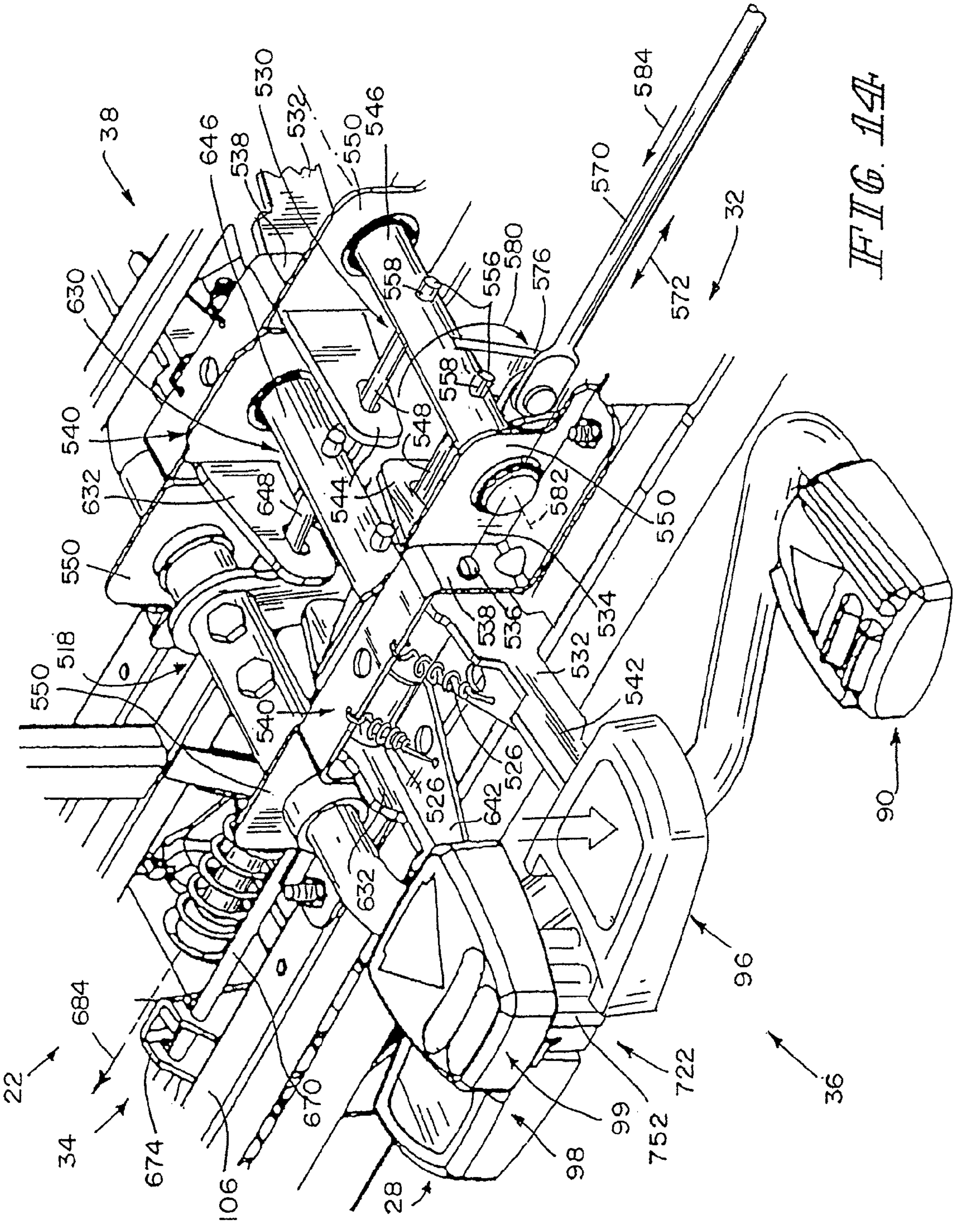
FIG. 14 is an enlarged perspective view, similar to FIG. 14, showing a head end side pedal pushed down to lower the head end of the upper frame.
Figure 15:
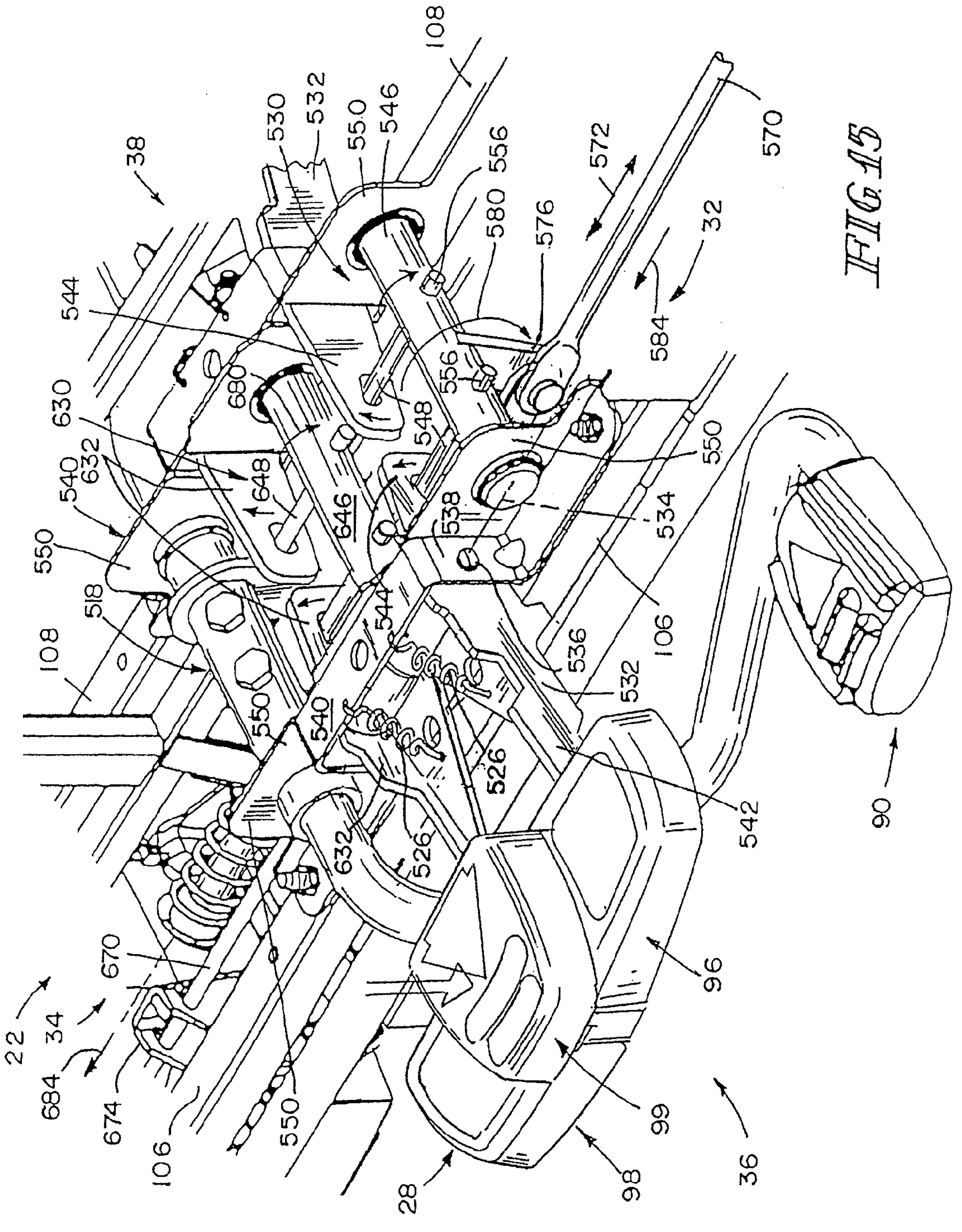
FIG. 15 is an enlarged perspective view, similar to FIG. 1, showing the center pedal pushed down to lower both ends of the upper frame.
Figure 16:
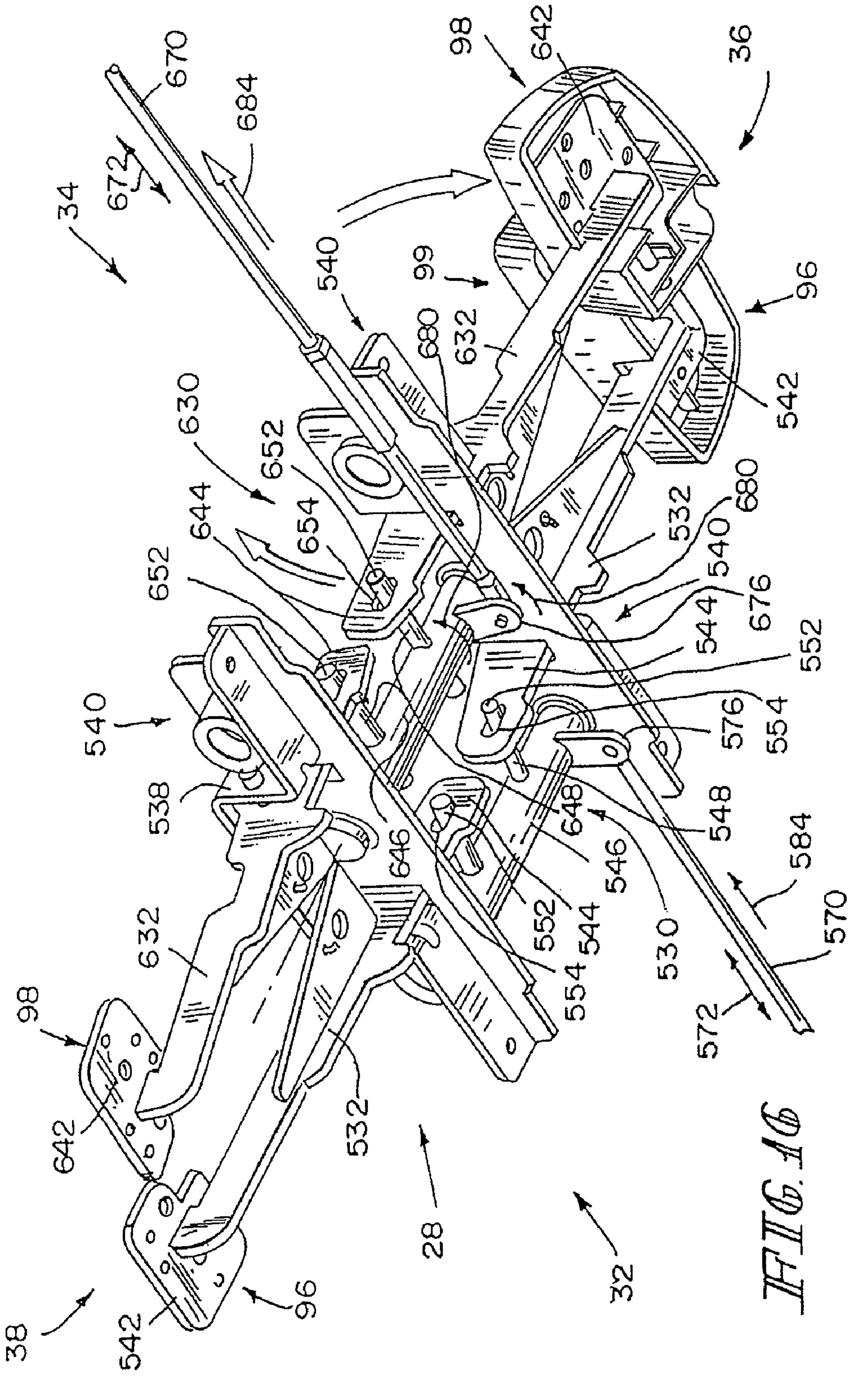
FIG. 16 is a bottom perspective view of a linkage coupling the side pedals to the head and foot end release pins.

As shown in FIGS. 13-16, the first linkage 530 includes an arm 532 that extends laterally outwardly from each side frame member 106, 108 of the lower frame 22. Thus, one arm 532 extends laterally outwardly from the left side frame member 106 and another arm 532 extends laterally outwardly from the right side frame member 108. As shown in FIG. 13, each arm 532 is mounted near its midpoint to an associated side frame member 106, 108 for pivoting movement about a pivot axis 534 defined by a longitudinal pin 536. The longitudinal pin 536 is supported by a pair of laterally-extending longitudinally-spaced flanges 538 of a bracket 540 secured to an associated side frame member 106, 108. The outer end 542 of each arm 532 supports a head end side pedal 96. The inner end 544 of each arm 532 is coupled to a lateral shaft 546 via a link 548. The lateral shaft 546 is supported by longitudinally-extending laterally-spaced flanges 550 of the associated brackets 540 secured to the respective side frame members 106, 108. As shown in FIG. 16, a distal end 552 of each link 548 extends through a slightly oversized opening 554 in the inner end of the associated arm 532. A proximal end 556 of each link 548 is press fitted into an opening 558 in the lateral shaft 546.

As shown in FIGS. 2-3 and 13-16, a longitudinally-extending rod 570 is coupled to the lower frame 22 for reciprocating longitudinal movement as indicated by a double-headed arrow 572. A head end 32 of the rod 570 carries a flange 574 (FIG. 3) that actuates the pressure release pin 520 (FIG. 18) of the head end hydraulic pump 92. A foot end 34 of the rod 570 is coupled to a flange 576 (FIG. 16) that extends downwardly from an underside of the lateral shaft 546. As one of the head end side pedals 96 is depressed, the outer end 542 of the associated arm 532 travels downwardly. As the outer end 542 of the arm 532 travels downwardly, the inner end 544 of the arm 532 travels upwardly. As the inner end 544 of the arm 532 travels upwardly, the distal end 552 of the link 548 travels upwardly. As the distal end 552 of the link 548 travels upwardly, the lateral shaft 546 turns in a clockwise direction 580 (FIG. 14) about a pivot axis 582 as viewed from the left side 36 of the stretcher 20. As the lateral shaft 546 turns in the clockwise direction 580, the rod 570 is pulled toward the foot end 34 in a direction 584 to actuate the head end pressure release pin 520 (FIG. 18) to release the pressure in the head end hydraulic cylinder 82 to, in turn, lower the head end 32 of the upper frame 22. The downward travel of the head end 32 of the upper frame 22 stops when the head end side pedal 96 is released.

As shown in FIGS. 2-3 and 13-16, the second linkage 630 includes an arm 632 that extends laterally outwardly from each side frame member 106, 108 of the lower frame 22. Thus, one arm 632 extends laterally outwardly from the left side frame member 106 and another arm 632 extends laterally outwardly from the right side frame member 108. Each arm 632 is mounted near its midpoint to an associated side frame member 106, 108 for pivoting movement about the pivot axis 534 defined by the longitudinal pin 536. The longitudinal pin 536 is supported by the pair of laterally-extending longitudinally-spaced flanges 538 of a bracket 540 secured to an associated side frame member 106, 108. The outer end 642 of each arm 632 supports a foot end side pedal 98. The inner end 644 of each arm 632 is coupled to a lateral shaft 646 via a link 648. The lateral shaft 646 is supported by longitudinally-extending laterally-spaced flanges 550 of the associated brackets 540 secured to the respective side frame members 106, 108. A distal end 652 of each link 648 extends through a slightly oversized opening 654 in the inner end of the associated arm 632. A proximal end 656 of each link 648 is press fitted into an opening 658 in the lateral shaft 646.

As shown in FIGS. 13-16, a longitudinally-extending rod 670 is coupled to the lower frame 22 for reciprocating longitudinal movement as indicated by a double-headed arrow 672. A foot end 34 of the rod 670 carries a flange 674 that actuates the pressure release pin 520 of the foot end hydraulic pump 94. A head end 32 of the rod 670 is coupled to a flange 676 that extends downwardly from an underside of the lateral shaft 646. As one of the foot end side pedals 98 is depressed, the outer end 642 of the associated arm 632 travels downwardly. As the outer end 642 of the arm 632 travels downwardly, the inner end 644 of the arm 632 travels upwardly. As the inner end 644 of the arm 632 travels upwardly, the distal end 652 of the link 648 travels upwardly. As the distal end 652 of the link 648 travels upwardly, the lateral shaft 646 turns in a clockwise direction 680 (FIG. 16) about a pivot axis 682 as viewed from the left side 36 of the stretcher 20. As the lateral shaft 646 turns in the clockwise direction 680, the rod 670 is pushed toward the foot end 34 in a direction 684 to actuate the foot end pressure release pin 520 to release the pressure in the foot end hydraulic cylinder 84 to, in turn, lower the foot end 34 of the upper frame 22. The downward travel of the foot end 34 of the upper frame 22 stops when the foot end side pedal 98 is released.

Figure 17:
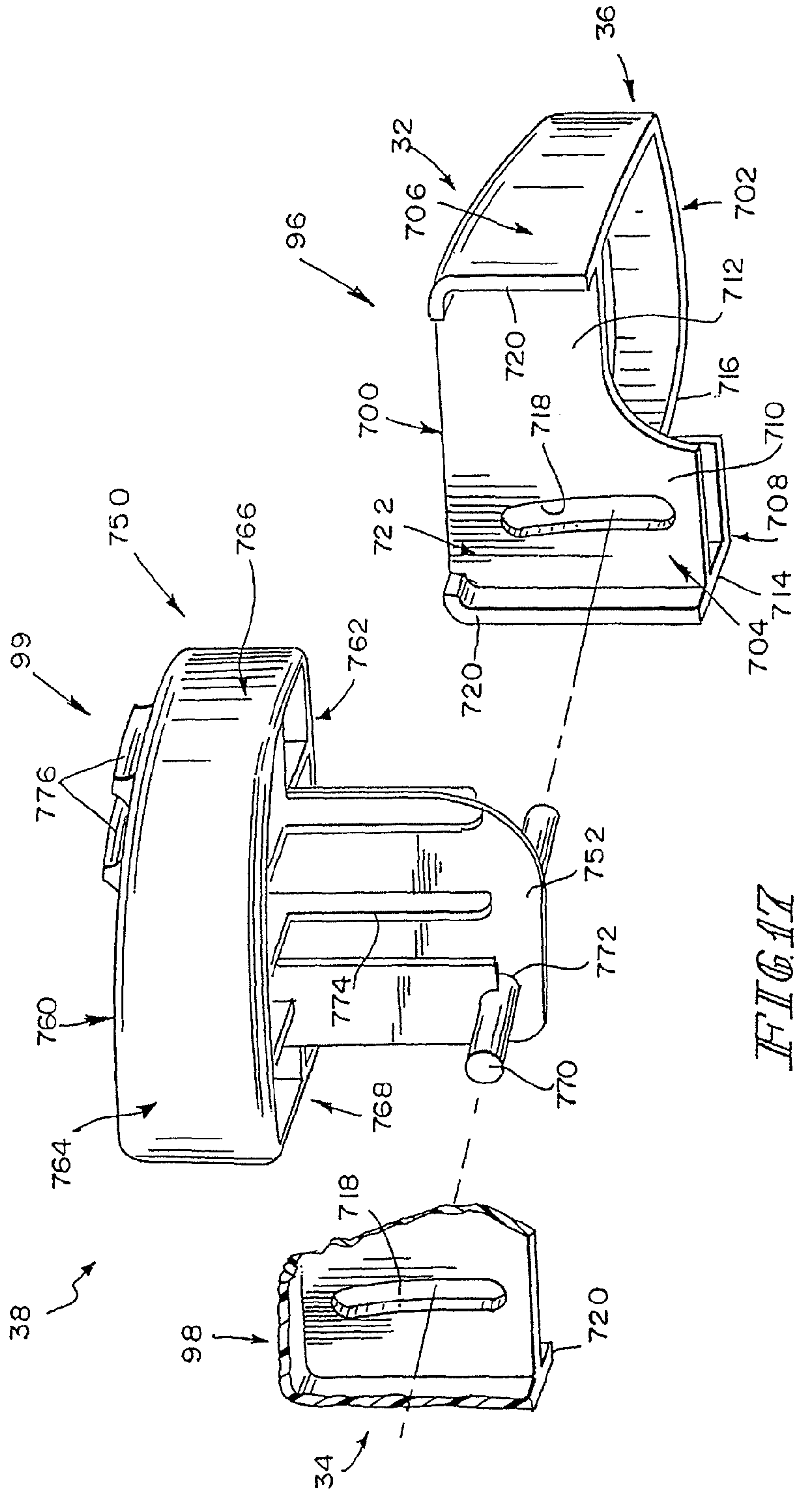
FIG. 17 is a perspective view showing the center pedal and the two side pedals that support the center pedal.

FIG. 17 shows the pedals 96, 98 and 99 on the left side 36 of the stretcher 20. The pedals 96, 98 and 99 on the right side 38 of the stretcher 20 are identical. As shown in FIG. 17, the head end side pedal 96 includes a top wall 700, a right wall 702, a left wall 704, a front wall 706, and a back wall 708. The right, left, front and back walls 702, 704, 706, 708 extend downwardly from an outer perimeter of the top wall 700. As shown in FIGS. 13-15, the top wall 700 tapers slightly downwardly toward the head end 32. The left wall 704, which is the inner wall 704 of the head end side pedal 96, faces the foot end side pedal 98. The walls 702, 706, which are the outer walls 702, 706 of the side pedal 96, are exposed. The left or inner wall 704 has a first portion 710 that has a first height and a second portion 712 that arches upwardly and forwardly toward the front wall 706. The back wall 708 has a first portion 714 that has the first height and a second portion 716 that has a second height that is less than the first height. The two outer walls 702, 706 each has the second height. The left or inner wall 704 has an arcuate slot 718. The front and back walls 706, 708 of the side pedal 96 extend a short distance beyond the left or inner wall 704 to form a pair of vertically-extending opposed ribs 720.

Still referring to FIG. 17, the foot end side pedal 98 is a mirror image of the head end side pedal 96. The side pedal 98 includes a top wall, a right wall, a left wall, a front wall, and a back wall. The right, left, front and back walls of the side pedal 98 extend downwardly from an outer perimeter of the top wall. As shown in FIGS. 13-15, the top wall of the side pedal 98 tapers downwardly toward the foot end 34. The right or inner wall of the foot end side pedal 98, which is the wall that faces the head end side pedal 96, has a first portion that has a first height and a second portion that arches upwardly and forwardly toward the front wall. The back wall has a first portion that has the first height and a second portion that has a second height that is less than the first height. The two outer walls of the side pedal 98 each has the second height. The right or inner wall of the side pedal 98 has an arcuate slot 718, similar to the arcuate slot 718 in the left or inner wall 704 of the side pedal 96. The front and back walls of the side pedal 98 extend a short distance beyond the right wall to form vertically-extending ribs 720. When the side pedals 96, 98 are mounted to the associated arms 532, 632, the two inner walls 704 and the ribs 720 of the side pedals 96, 98 define a vertically-extending cavity 722.

As shown in FIG. 17, the center pedal 99 has a body portion 750 and a laterally-extending flange portion 752 that extends downwardly from the body portion 740. The body portion 750 includes a top wall 760, a right wall 762, a left wall 764, a front wall 766, and a back wall 768. The right, left, front and back walls 762, 764, 766, 768 extend downwardly from an outer perimeter of the top wall 760. As shown in FIGS. 13-15, the top wall 760 tapers forwardly toward the left end 36. The outer walls 762, 764, 766 of the center pedal 99, the outer walls 702, 706 of the side pedal 96, and the outer walls 703, 707 (FIG. 14) of the side pedal 98 each has substantially the same height. A longitudinally-extending pin 770 is press fitted into an opening 772 in the laterally-extending flange portion 752. A plurality of longitudinal reinforcing ribs 774 extend downwardly from the underside of the top wall 750. Two longitudinal ribs 776 extend upwardly from the topside of the top wall 750.

When the center pedal 99 is positioned over the two side pedals 96, 98, 1) the downwardly-facing surfaces of the center pedal 99 rest on the upwardly-facing surfaces of the side pedals 96, 98 as shown in FIGS. 13-15, 2) the flange portion 752 of the center pedal 99 is received in the vertically-extending cavity 722 (FIG. 14) formed between the inner walls 704 and the ribs 720 of the side pedals 96, 98, and 3) the outer ends of the laterally-extending pin 770 are received in arcuate slots 718 in the inner walls 704 of the side pedals 96, 98, and 4) the side pedals 96, 98 extend outwardly beyond the center pedal 99 as shown in FIGS. 13-15 to expose a surface that can be depressed by the foot of a user. Thus, the center pedal 99 is captured by the side pedals 96, 98 and floats on top of the side pedals 96, 98 without a direct connection to the lower frame 22. This arrangement allows 1) simultaneous lowering of both the side pedals 96, 98 (by depressing the center pedal 99) to evenly lower both the head and foot ends 32, 34 of the upper frame 22, or 2) the individual lowering of the head end side pedal 96 to lower the head end 32 of the upper frame 22, or 3) the individual lowering of the side pedal 98 to lower the foot end 34 of the upper frame 22.

Figure 19:
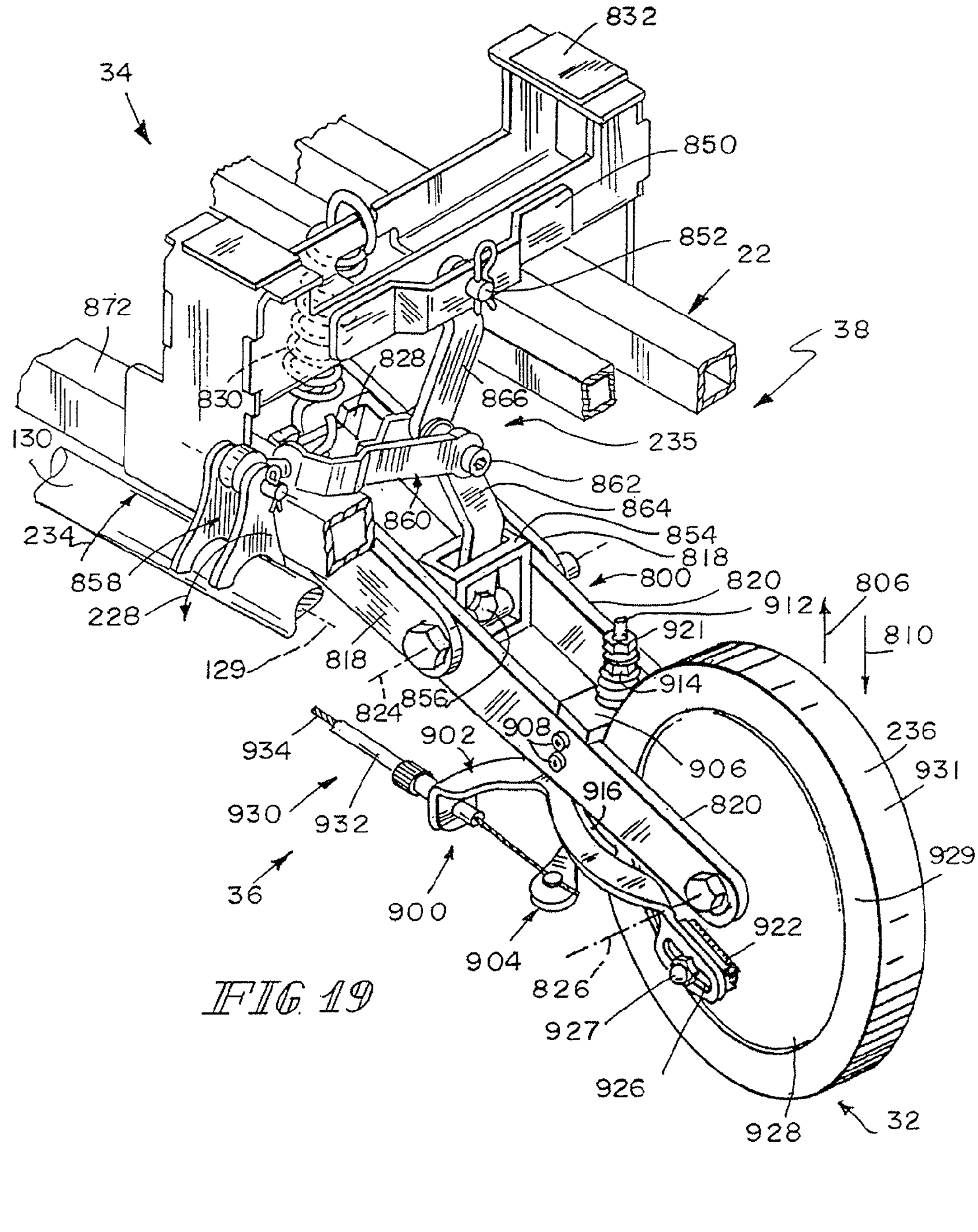
FIG. 19 is a perspective view of the steering wheel pivotably coupled to the lower frame by a wheel-mounting bracket and the wheel-mounting bracket coupled to the longitudinal brake-steer shaft by a linkage assembly, and showing a pair of caliper arms of a hand-actuated wheel braking apparatus pivotably coupled to the wheel-mounting bracket such that the caliper arms are disposed on opposite sides of the steering wheel and a Bowden cable having a first end coupled to the brake handle (FIG. 24) and a second end coupled to the caliper arms so that when the brake handle is activated the caliper arms move associated brake pads against the steering wheel.
Figure 20:
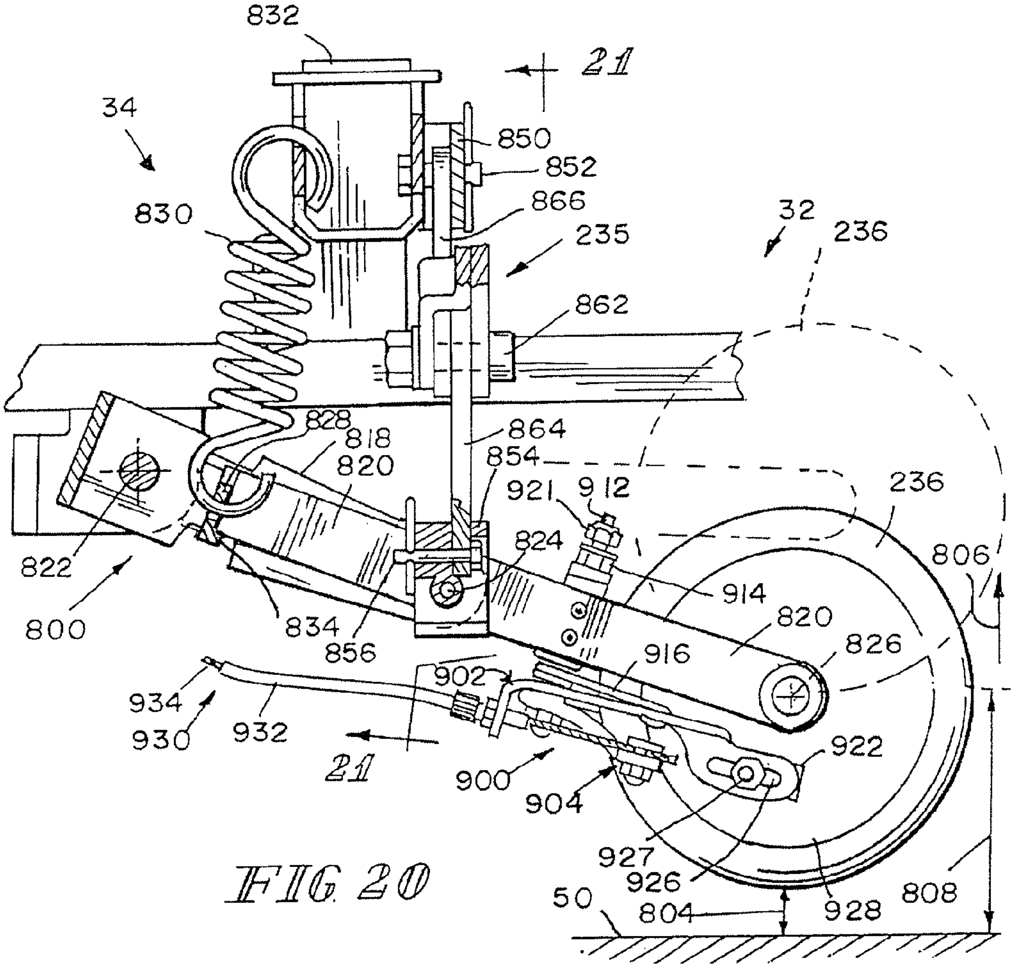
FIG. 20 is a left side elevation view of the wheel-mounting bracket and the linkage assembly showing the steering wheel in a neutral position (in solid) and showing the steering wheel moved to a braking position (in phantom)

As indicated above, the stretcher 20 includes a linkage assembly 235 for raising lowering the steering wheel 236. As shown in FIGS. 19-23, the steering wheel 236 is pivotably coupled to the lower frame 22 by a wheel-mounting bracket 800 and the wheel-mounting bracket 800 is, in turn, coupled to lower frame 22 and the longitudinal brake-steer shaft 130 by the linkage assembly 235. Rotation of the longitudinal brake-steer shaft 130 about its pivot axis 129 (FIG. 19) causes the linkage assembly 235 to change the position of the steering wheel 236 relative to the floor 50. For example, when the brake-steer pedals 132, 134 and the longitudinal brake-steer shaft 130 are in their respective neutral positions as shown in FIG. 19, the linkage assembly 235 holds the wheel-mounting bracket 800 and the steering wheel 236 off of the floor 50 by a first distance 804 as shown in FIG. 20. In the illustrative embodiment, the steering wheel 236 is spaced apart from the floor 50 by approximately 0.5 inches (1.3 cm) when the longitudinal brake-steer shaft 130 is in the neutral position.

Figure 21:
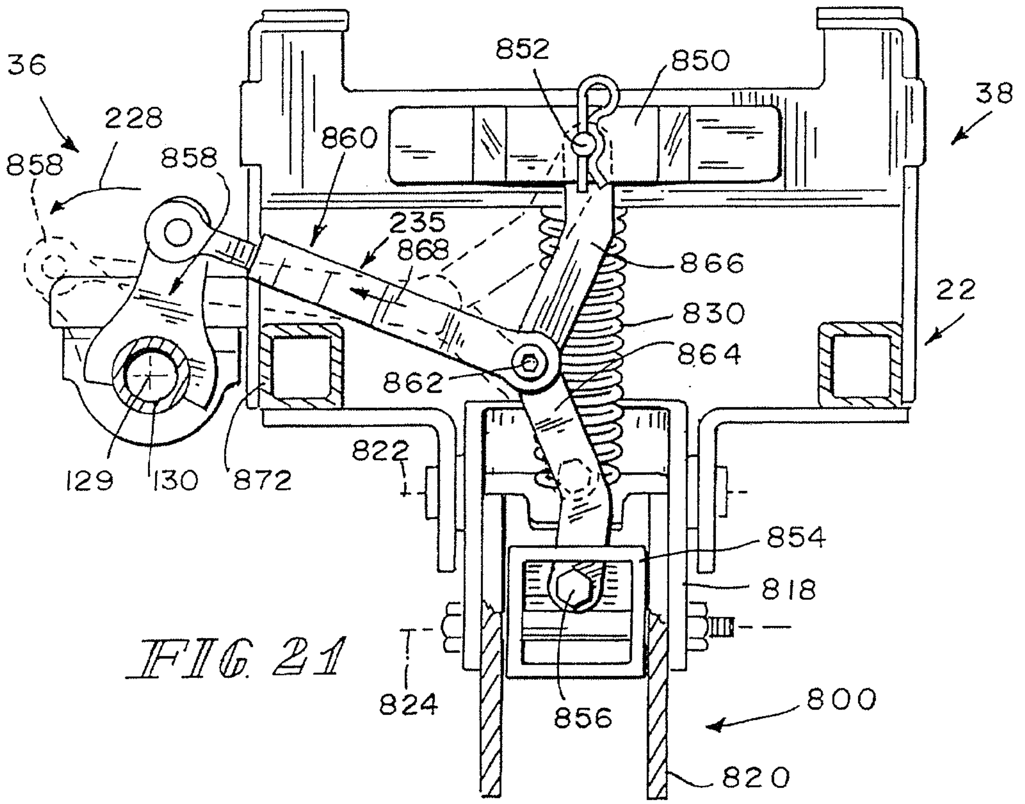
FIG. 21 is a sectional view taken along line 21-21 in FIG. 20 showing a pivot link fixed to the longitudinal brake-steer shaft for rotation therewith, a connecting link extending from the pivot link to a common pivot pin, a bracket link extending from the common pivot pin to the wheel-mounting bracket, and a frame link extending between the common pivot pin to the lower frame.

When the longitudinal brake-steer shaft 130 rotates in the braking direction 228 as shown in FIG. 21, the linkage assembly 235 pivots the wheel-mounting bracket 800 upwardly in the direction indicated by arrow 806 (FIG. 20) to lift the steering wheel 236 a second distance 808 (FIG. 20) from the floor 50. The second distance 808 is sufficient to allow equipment such as the base (not shown) of an overbed table (not shown) to be positioned underneath the steering wheel 236 of the stretcher 20. In the illustrative embodiment, the second distance 808 of the steering wheel 236 is about 3.5 inches (8.9 cm). When the longitudinal brake-steer shaft 130 rotates in the steering direction 234 as shown in FIG. 23, the linkage assembly 235 pivots the wheel-mounting bracket 800 downwardly in the direction indicated by arrow 810 (FIG. 22) to deploy the steering wheel 236 to the steering position where the steering wheel 236 contacts the floor 50 (FIG. 22).

The wheel-mounting bracket 800 includes an outer fork 818 and an inner fork 820 pivotably coupled to the outer fork 818. The outer fork 818 is pivotably coupled at its foot end 34 to the lower frame 22 for pivoting movement about a first transverse pivot axis 822 as shown in FIGS. 20, 22. A head end 32 of the outer fork 818 is pivotably coupled to the inner fork 820 so that outer and inner forks 818, 820 can pivot relative to one another about a second transverse pivot axis 824 as shown in FIG. 19. A head end 32 of the inner fork 820 extends from second transverse pivot axis 824 toward the head end 32 of the stretcher 20. The steering wheel 236 is mounted to the head end 32 of the inner fork 820 for rotation about a third transverse pivot axis 826 as shown in FIG. 19. A foot end 34 of the inner fork 820 extends from the second transverse pivot axis 824 toward the foot end 34 of the stretcher 20. An end plate 828 is fixed to the foot end 34 of the inner fork 820 as shown in FIG. 19. A vertically oriented spring 830 connects the end plate 828 of the inner fork 820 to a frame bracket 832 mounted to the lower frame 22.

When the steering wheel 236 is in the neutral, braking, and steering positions, the spring 830 yieldably biases the end plate 828 and the foot end 34 of the inner fork 820 upwardly so that the head end 32 of the inner fork 820, and the steering wheel 236 coupled thereto, are yieldably biased downwardly. The end plate 828 has a pair of transversely extending barbs 834 that are appended to a lower end of end plate 828 and that are positioned to engage the bottom of the outer fork 818 when the outer and inner forks 818, 820 are in an "in-line" configuration as shown in FIGS. 19, 20. Thus, as the spring 830 biases the end plate 828 of the inner fork 820 upwardly, the barbs 834 stop the upward movement of the end plate 828 at the in-line configuration to limit the downward movement of the head end 32 of the inner fork 820, and the steering wheel 236 coupled thereto, relative to the outer fork 818.

Figure 22:
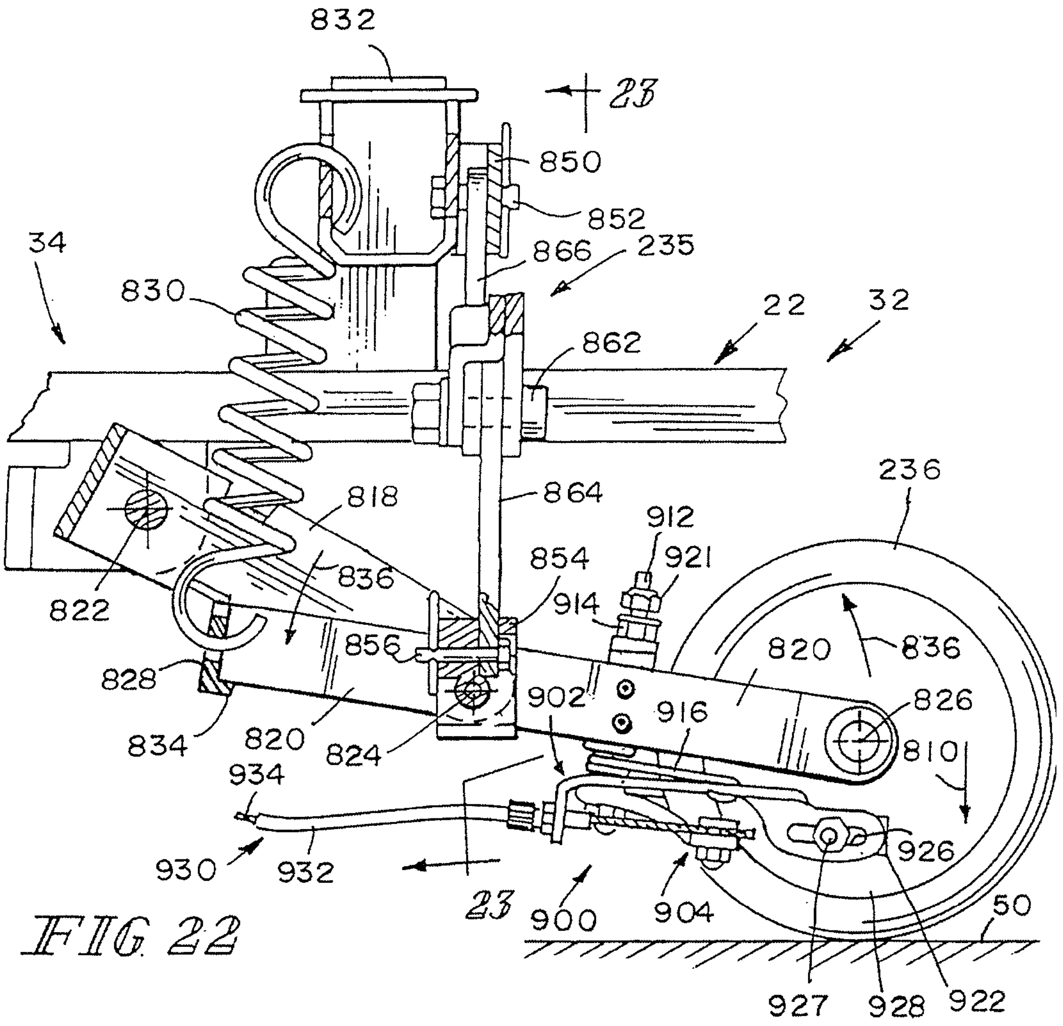
FIG. 22 is a view, similar to FIG. 20, showing the steering wheel in a steering position engaging the floor and showing a spring yieldably biasing the steering wheel against the floor.
Figure 23:
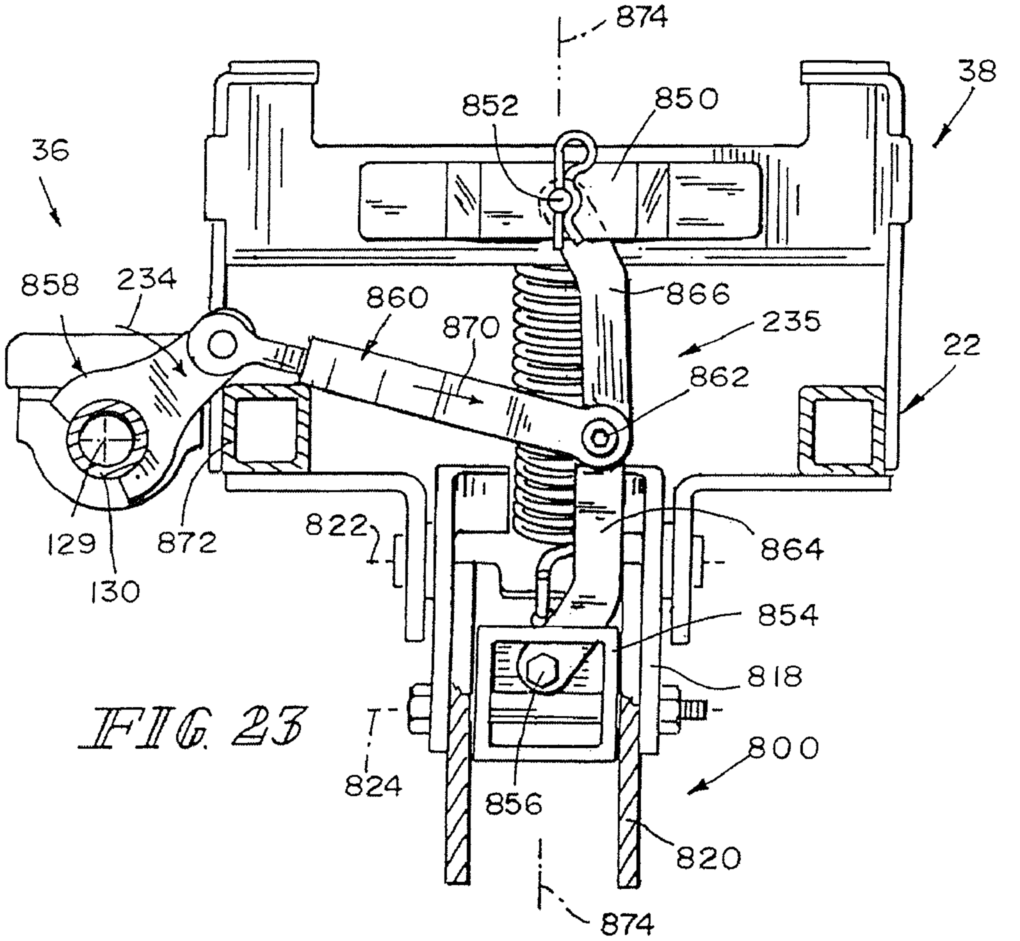
FIG. 23 is a sectional view, similar to FIG. 21, taken along line 23-23 in FIG. 22 showing the pivot link pivoted toward the steering wheel, thereby opening the scissors arrangement defined by the bracket link and the frame link and pivoting the wheel-mounting bracket carrying the steering wheel downwardly.

When the longitudinal brake-steer shaft 130 and the linkage assembly 235 pivots the wheel-mounting bracket 800 downwardly to the steering position deploying the steering wheel 236, the steering wheel 236 engages the floor 50 as shown in FIG. 22. Continued downward movement of the wheel-mounting bracket 800 pivots the inner fork 820 relative to the outer fork 818 about the second transverse pivot axis 824 in the direction indicated by arrows 836 in FIG. 22, moving the outer and inner forks 818, 820 into an "angled" configuration as shown in FIG. 22. The end plate 828 is yieldably biased upwardly by the spring 830 to yieldably bias the steering wheel 236 downwardly against the floor 50. The upward force provided by the spring 830 to the foot end 34 of the inner fork 820 and, hence, the downward force biasing the head end 32 of the inner fork 820, and the steering wheel 236 coupled thereto, against the floor 50 is sufficient to prevent the steering wheel 236 from sliding sideways when the stretcher 20 is turned.

As shown in FIG. 22, when the steering wheel 236 is deployed, the spring 830 biases the inner fork 820 away from the angled configuration of the outer and inner forks 818, 820 and toward the in-line configuration so that the steering wheel 236 is biased to a position past the plane of the floor 50 and past the plane defined by the wheels 64 of the casters 24. Of course, the floor 50 limits the downward movement of the deployed steering wheel 236. However, if the floor 50 has a surface that is not planar or that is not coincident with the plane defined by the wheels 64 of the casters 24, the spring 830 cooperates with the outer and inner forks 818, 820 to maintain contact between the steering wheel 236 and the floor 50. For example, when the stretcher 20 passes over a threshold of a doorway, the spring 830 and the outer and inner forks 818, 820 cooperate to maintain engagement of the deployed steering wheel 236 against the floor 50.

As shown in FIG. 19, the linkage assembly 235 is connected to the frame bracket 832 by an upper bracket 850 positioned to lie generally above the linkage assembly 235 and by an upper pivot pin 852 coupled to the upper bracket 850. Also, the linkage assembly 235 is connected to the wheel-mounting bracket 800 by a lower bracket 854 positioned to lie generally beneath the linkage assembly 235 and by a lower pivot pin 856 coupled to the lower bracket 854. In addition, the linkage assembly 235 is connected to the longitudinal brake-steer shaft 130 as shown in FIGS. 19, 21, 23. A pivot link 858 of the linkage assembly 235 is fixed to the longitudinal brake-steer shaft 130 and a connecting link 860 extends from the pivot link 858 to a "common" pivot pin 862. A bracket link 864 extends from the common pivot pin 862 to the lower pivot pin 856 of the lower bracket 854 and a frame link 866 extends from the common pivot pin 862 to the upper pivot pin 852 of the upper bracket 850 as shown in FIGS. 19-23. Thus, the connecting link 860, the bracket link 864, and the frame link 866 are each pivotably connected to the common pivot pin 862.

The bracket link 864 and the frame link 866 form a scissors arrangement as shown in FIGS. 19, 21, 23. When the caregiver depresses the braking portion 131 of the brake-steer pedals 132, 134 and rotates the longitudinal brake-steer shaft 130 in the braking direction 228 as shown in FIG. 21 toward the braking position, the pivot link 858 pivots away from the wheel-mounting bracket 800 pulling the connecting link 860 and the common pivot pin 862 toward the longitudinal brake-steer shaft 130 in the direction indicated by arrow 868. Movement of the common pivot pin 862 in direction 868 closes the scissors arrangement formed by the bracket link 864 and the frame link 866, thereby pulling the bracket link 864 upwardly. Pulling the bracket link 864 upwardly pivots the wheel-mounting bracket 800 in direction 806 and lifts the steering wheel 236 off of the floor 50 as shown in phantom in FIG. 20.

When the caregiver depresses the steering portion 133 of the brake-steer pedals 132, 134 and rotates the longitudinal brake-steer shaft 130 in the steering direction 234 as shown in FIG. 23 toward the steering position, the pivot link 858 pivots toward the wheel-mounting bracket 800 pushing the connecting link 860 and the common pivot pin 862 away from the longitudinal brake-steer shaft 130 in the direction indicated by arrow 870. Movement of the common pivot pin 862 in direction 870 opens the scissors arrangement formed by the bracket link 864 and the frame link 866 and pushes the bracket link 864 downwardly. Pushing the bracket link 864 downwardly pivots the wheel-mounting bracket 800 in direction 810, thus deploying the steering wheel 236 into contact with the floor 50 as shown in FIG. 22.

When the longitudinal brake-steer shaft 130 is in the steering position, the pivot link 858 contacts a lower frame member 872 as shown in FIG. 23, stopping the longitudinal brake-steer shaft 130 from further rotation in the steering direction 234. When the pivot link 858 contacts the lower frame member 872, the common pivot pin 862 is in an "overcenter position" away from the longitudinal brake-steer shaft 130 and beyond a vertical plane defined by the upper and lower pivot pins 852, 856 and indicated by a line 874 (FIG. 23) so that the scissors arrangement formed by the bracket link 864 and the frame link 866 is in a generally fully-opened position. The upward tension of the spring 830 in conjunction with the overcenter position of the common pivot pin 862 biases the pivot link 858 against the lower frame member 872 and biases the common pivot pin 862 away from the longitudinal brake-steer shaft 130, thereby "locking" the steering wheel 236 and the longitudinal brake-steer shaft 130 in the steering position.

Thus, the stretcher 20 includes the brake-steer pedals 132, 134 connected to the longitudinal brake-steer shaft 130. Actuation of the brake-steer pedals 132, 134 by the caregiver simultaneously controls the position of the steering wheel 236 and the braking of the casters 24. The brake-steer pedals 132, 134 have a horizontal neutral position where the steering wheel 236 is positioned a distance 804 (FIG. 20) above the floor 50 and the casters 24 are free to rotate and swivel. From the neutral position, the caregiver can push the braking portion 131 of the brake-steer pedals 132, 134 down to rotate the longitudinal brake-steer shaft 130 to the braking position in which the casters 24 are prevented from rotating and swiveling. In addition, when the longitudinal brake-steer shaft 130 rotates to the braking position, the pivot link 858 pivots away from the wheel-mounting bracket 800 pulling the connecting link 860 and the common pivot pin 862 in direction 868 (FIG. 21) and closing the scissors arrangement of the bracket link 864 and the frame link 866 to lift the steering wheel 236 to a position where the steering wheel 236 is positioned a distance 808 above the floor 50.

The caregiver can also push the steering portion 133 of the brake-steer pedals 132, 134 down to rotate the longitudinal brake-steer shaft 130 past the neutral position to the steering position in which the casters 24 are free to rotate and swivel. In addition, when the longitudinal brake-steer shaft 130 rotates to the steering position, the pivot link 858 pivots toward the wheel-mounting bracket 800 pushing the connecting link 860 and the common pivot pin 862 in direction 870 (FIG. 23) and opening the scissors arrangement of the bracket link 864 and the frame link 866 to deploy the steering wheel 236 to engage the floor 50 with enough pressure to facilitate steering of the stretcher 20. The steering wheel 236 is spring-biased against the floor 50 so that the steering wheel 236 can pass over an obstacle, such as a 1 inch (2.5 cm) high threshold, without disengaging the steering wheel 236 from the floor 50.

Figure 24:
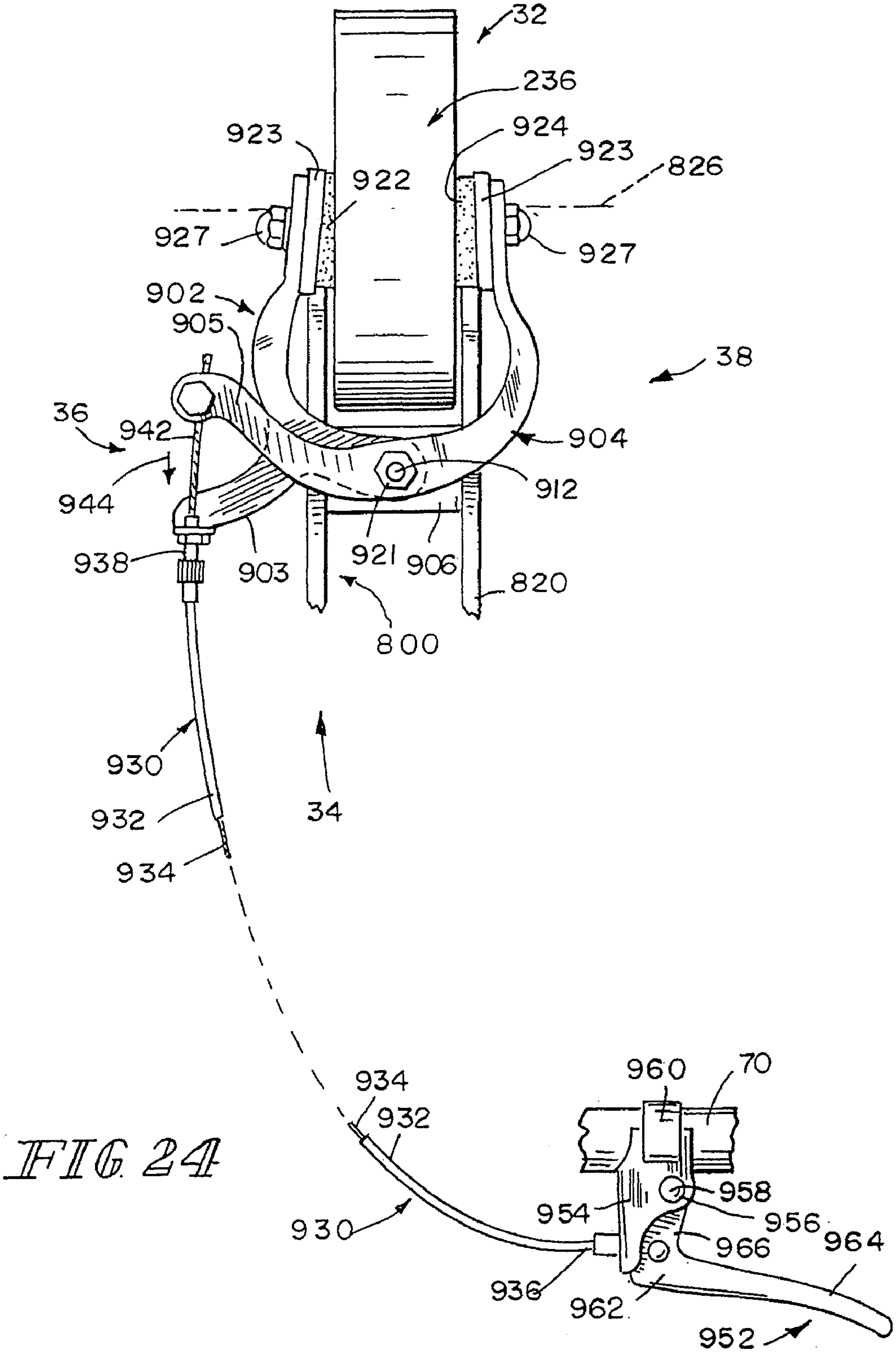
FIG. 24 is a bottom plan view of the hand-actuated wheel braking apparatus showing the caliper arms disposed on opposite sides of the steering wheel, each caliper arm carrying a brake pad, and the Bowden cable coupled to the brake handle and coupled to the caliper arms.
Figure 25:
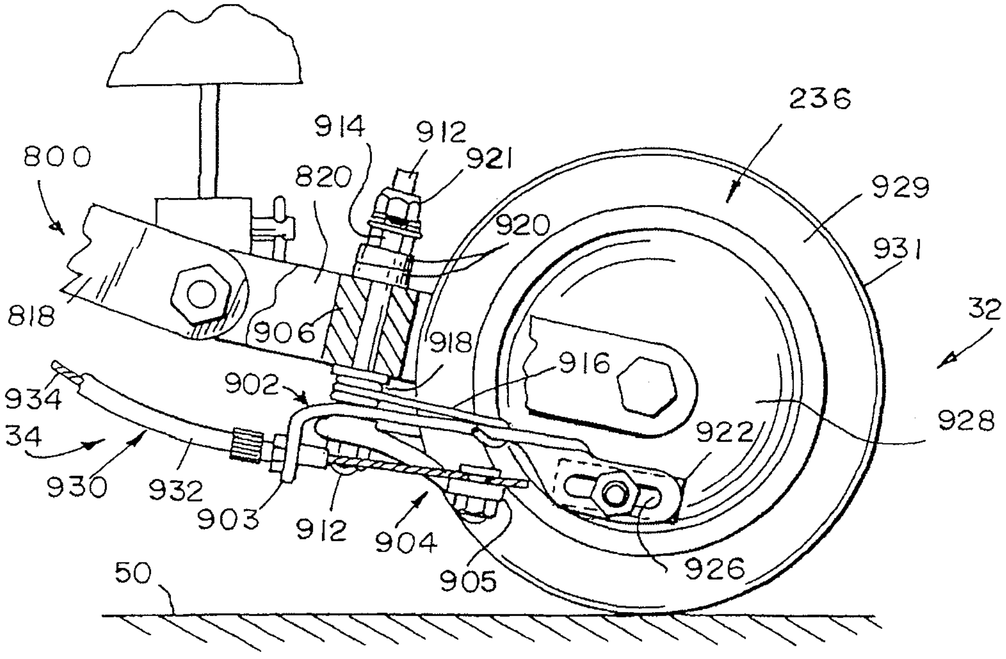
FIG. 25 is a left side elevation view of the wheel-mounting bracket showing the Bowden cable coupled to the caliper arms.
Figure 26:
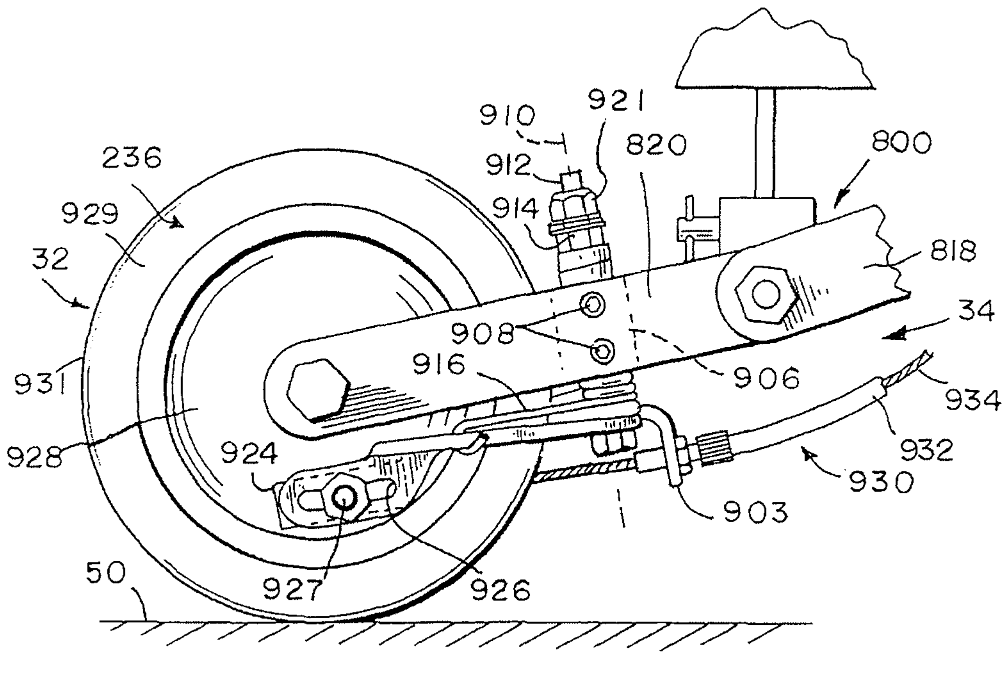
FIG. 26 is a right side elevation view, similar to FIG. 25, of the wheel-mounting bracket.

FIGS. 24-26 show a hand-actuated wheel braking apparatus 900 for braking the steering wheel 236. As indicated above, the steering wheel 236 is sometimes referred to as an auxiliary, center or 5$^{th}$ wheel. The hand-actuated wheel braking apparatus 900 may be used for braking two or more steering wheels, instead of braking a single steering wheel, such as the steering wheel 236, that raise and lower into and out of engagement with a floor. In addition, the hand-actuated wheel braking apparatus 900 may be used in lieu of or in addition to the hand-actuated caster braking apparatus 300 shown in FIGS. 4 and 7. As indicated above, the caster braking apparatus 300 is operable to brake the two casters 24 near the head end 32 of the stretcher 20. In contrast, the wheel braking apparatus 900 is operable to brake the steering wheel 236.

As shown in FIGS. 24-26, the wheel braking apparatus 900 includes a pair of curved caliper arms 902, 904 disposed on the opposite sides 36, 38 of the steering wheel 236. A mounting block 906 is secured to the inner fork 820 of the wheel-mounting bracket 800 near the steering wheel 236 by suitable fasteners, such as pins 908 (FIG. 26). The caliper arms 902, 904 are coupled to the mounting block 906 for pivoting movement about a pivot axis 910 (FIG. 26) defined by a generally vertically-extending bolt 912. As shown in FIG. 25, in the illustrated embodiment, the bolt 912, secured in place by a nut 914, extends successively through the respective openings in the caliper arms 902, 904, a biasing spring 916, a washer 918, the mounting block 906, and a pair of washers 920. A locknut 921 is secured to the free end of the bolt 912.

Each caliper arm 902, 904 has an extension 903, 905. As shown in FIG. 24, which is a bottom view, the extensions 903, 905 of the caliper arms 902, 904 are located on the left side 36 of the wheel-mounting bracket 800 and the steering wheel 236. As shown in FIG. 25, the caliper arm 902 is generally located above the caliper arm 904. Each caliper arm 902, 904 carries an associated brake pad 922, 924. As shown in FIG. 24, in the illustrated embodiment, the upper caliper arm 902 carries the brake pad 922 that is located on the left side 36 of the steering wheel 236. The lower caliper arm 904 carries the brake pad 924 that is located on the right side 38 of the steering wheel 236.

Each brake pad 922, 924 includes a backing member 923 and a threaded pin (not shown) that extends rearwardly from the associated backing member 923. The threaded pins extend through respective elongated slots 926 (FIGS. 25, 26) in the caliper arms 902, 904 and are secured in place by associated nuts 927. The caliper arms 902, 904 are movable between a braking position where the brake pads 922, 924 engage the hub 928 of the steering wheel 236 to impede the rotation of the steering wheel 236 and a releasing position where the brake pads 922, 924 are spaced apart from the hub 928 of the steering wheel 236 to allow rotation of the steering wheel 236. The spring 916 is configured to bias the caliper arms 902, 904 toward their respective releasing or open positions. The longitudinal position and the angular orientation of the brake pads 922, 924 can be adjusted so that the brake pads 922, 924 do not engage the rim 929 of the steering wheel 236 when the caliper arms 902, 904 are in their respective releasing positions.

As shown in FIG. 24, in the illustrated embodiment, the apparatus 900 includes a brake handle 952 coupled to the handle post 70 of one of the push handles 66, 68. In the illustrated embodiment, the brake handle 952, like the brake handle 302 in FIG. 7, is coupled to the push handle 68, which is the push handle on the right side of a caregiver standing near the head end 32 of the stretcher 20. The brake handle 952 is pivotally mounted to a mounting bracket 954 by a screw 956 for pivoting movement about a pivot axis 958. The mounting bracket 954 is, in turn, secured to the handle post 70 of the push handle 68 by a retaining clip 960. Suitable fasteners, such as screws (not shown), may be used for securing the retaining clip 960 to the handle post 70. As shown in FIG. 24, the brake handle 952 includes a hub portion 962, a handgrip portion 964 and a leg portion 966. When the brake handle 952 is mounted to the handle post 70, the handgrip portion 964 extends generally laterally outwardly and the leg portion 966 extends generally longitudinally outwardly relative to the hub portion 962, in a manner shown in FIG. 7 with respect to the brake handle 302.

As shown in FIG. 24, in the illustrated embodiment, the wheel braking apparatus 900 includes a Bowden cable 930 having a sheath 932 and an elongated wire 934 slidably received therein. The sheath 932 has a first end 936 coupled to the mounting bracket 954 of the brake handle 952 and a second end 938 coupled to the extension 903 of the caliper arm 902. The wire 934, on the other hand, has a first end (not shown) coupled to the leg portion 966 of the brake handle 952 and a second end 942 coupled to the extension 905 of the caliper arm 904.

The brake handle 952 is sufficiently close to the handle post 70 to allow a caregiver to simultaneously grasp the handle post 70 and the handgrip portion 964 of the brake handle 952 and squeeze the handgrip portion 964 to pull the second end 942 of the wire 934 in a direction indicated by arrow 944 (FIG. 24) to move the extensions 903, 905 of the caliper arms 902, 904 toward each other. When the extensions 903, 905 of the caliper arms 902, 904 move toward each other, the caliper arms 902, 904 move to their respective braking or closed positions where the brake pads 922, 924 engage the hub 928 of the steering wheel 236 to impede the rotation of the steering wheel 236. In the illustrative embodiment, the amount of force a typical caregiver can exert on the brake handle 952 does not cause the brake pads 922, 924 to engage the hub 928 of the steering wheel 236 with sufficient force to stop the rotation of the steering wheel 236.

By providing the stretcher 20 with the hand-actuated wheel braking apparatus 900, including the brake handle 952 that is squeezed by a caregiver to move the brake pads 922, 924 into contact with the hub 928 of the steering wheel 236 to impede its rotation, the caregiver is able to slow the speed at which the stretcher 20, along with any patient and/or equipment carried by the stretcher 20, travels along the floor. Such slowing may be desirable, for example, when turning the stretcher around a corner from one hallway into another hallway or into a room or when the stretcher is being pushed down a ramp in a healthcare facility. When an obese patient is being transported by the stretcher 20, and especially when the stretcher 20 is being pushed down a ramp while carrying an obese patient, the ability of the caregiver to use the hand-actuated wheel braking apparatus 900 to slow the speed of the stretcher 20 is a significant improvement over the known prior art stretchers. In fact, because the stretcher 20 has the apparatus 900 for slowing the speed of the stretcher 20 during transport, less caregivers may be needed to transport patients, including obese patients, from one location to another in a healthcare facility than may otherwise be needed, especially if a ramp is encountered along the transport route.

In some other embodiments, the caliper arms 902, 904 are movable between a braking position where the brake pads 922, 924 engage the rim 929 of the steering wheel 236, instead of the hub 928 of the steering wheel 236, to impede the rotation of the steering wheel 236 and a releasing position where the brake pads 922, 924 are spaced apart from the rim 929 of the steering wheel 236 to allow rotation of the steering wheel 236. In still other embodiments, the caliper arms 902, 904 are movable between a braking position where the brake pads 922, 924 engage the tread 931 of the steering wheel 236 to impede the rotation of the steering wheel 236 and a releasing position where the brake pads 922, 924 are spaced apart from the tread 931 of the steering wheel 236 to allow rotation of the steering wheel 236.

In alternative embodiments, the caliper arms 902, 904 are operated by the brake handle 302 shown in FIG. 7, instead of the brake handle 952 shown in FIG. 24. In such embodiment, the second end 373 (FIG. 4) of the sheath 372 of the Bowden cable 370 is attached to the extension 903 of the caliper arm 902 and the second end 378 (FIG. 4) of the wire 374 of the Bowden cable 370 is attached to the extension 905 of the caliper arm 904. When the handgrip portion 322 of the brake handle 302 is squeezed, the second end 942 of the wire 934 is pulled in the direction 944 (FIG. 24) to move the extensions 903, 905 of the caliper arms 902, 904 toward each other. When the extensions 903, 905 of the caliper arms 902, 904 move toward each other, the scissors arrangement formed by the caliper arms 902, 904 closes to move the brake pads 922, 924 into engagement with the hub 928 of the steering wheel 236 to impede the rotation of the steering wheel 236.

Although certain illustrative embodiments have been described in detail above, variations and modifications exist within the scope and spirit of this disclosure as described and as defined in the following claims.

The invention claimed is:

1. A patient support apparatus comprising:

a frame configured to support a patient lying in a supine position, a plurality of casters coupled to the frame and supporting the frame above a floor, a wheel coupled to the frame and arranged to lie in spaced-apart relation to the plurality of casters, the wheel movable relative to the frame between a first position engaging the floor and a second position spaced-apart from the floor, a brake movable between a braking position engaging the wheel to impede the rotation of the wheel and a releasing position allowing rotation of the wheel when in the first position engaging the floor, a push handle coupled to the frame and gripable to maneuver the patient support apparatus along the floor, and a brake handle coupled to the push handle and movable to move the brake to the braking position to brake the wheel.

2. The apparatus of claim 1, wherein the push handle is movable between a use position above a patient support surface and a storage position below the patient support surface.

3. The apparatus of claim 1, wherein the frame has first and second ends with two corner regions at each end and the plurality of casters comprises four casters coupled to the frame near the four corners regions.

4. The apparatus of claim 1, wherein the brake normally allows rotation of the wheel, and the brake impedes the rotation of the wheel when the brake handle is activated.

5. The apparatus of claim 1, wherein the brake includes a caliper arm carrying a brake pad, and the brake handle is coupled to the caliper arm for moving the brake pad into and out of engagement with the wheel.

6. The apparatus of claim 5, wherein the brake includes a cable having a first end coupled to the brake handle and a second end coupled to the caliper arm.

7. The apparatus of claim 6, wherein the cable is routed from the brake handle through the push handle.

8. The apparatus of claim 6, wherein the push handle includes a hollow tube portion and the cable is routed through the hollow tube portion.

9. The apparatus of claim 6, wherein the push handle includes a bend at a region defining an intersection of a generally vertically-extending portion and a generally horizontally-extending portion, and the cable is routed through the bend.

10. The apparatus of claim 9, wherein the generally horizontally-extending portion extends generally perpendicular to a longitudinal axis of the frame.

11. The apparatus of claim 6, wherein the push handle includes a bottom portion, and the cable exits the push handle through the bottom portion.

12. The apparatus of claim 6, wherein the cable is a Bowden cable having an outer sheath and an inner wire slidably received therein.

13. The apparatus of claim 12, wherein the caliper arm comprises a pair of caliper arms, each caliper arm carries a brake pad and has an extension on one side thereof, the caliper arms are pivoted about a common pivot axis such that the brake pads are disposed on opposite sides of the wheel, the sheath of the Bowden cable is coupled to one of the two extensions and the wire of the Bowden cable is coupled to the other of the two extensions so that when the brake handle is activated the caliper arms move the brake pads against the wheel.

14. The apparatus of claim 13, wherein the common pivot axis of the caliper arms extends in a direction generally perpendicular to an axis of rotation of the wheel.

15. The apparatus of claim 1, wherein the brake engage a rim of the wheel.

16. The apparatus of claim 1, wherein the brake engage a hub of the wheel.

17. The apparatus of claim 1, wherein the brake engage a tread of the wheel.

18. The apparatus of claim 1, wherein the frame comprises a lower frame and an upper frame supported above the lower frame and movable relative to the lower frame, the plurality of casters are coupled to the lower frame, and the push handle is coupled to the upper frame.

19. The apparatus of claim 1, wherein the push handle has a proximal end portion coupled to the frame and a distal end portion, and the brake handle is coupled to the distal end portion.

* * * * *